United States Patent
Oomori et al.

(10) Patent No.: US 12,131,336 B2
(45) Date of Patent: Oct. 29, 2024

(54) MOBILE TERMINAL APPARATUS AND MANAGEMENT APPARATUS

(71) Applicant: NTT DOCOMO, INC., Chiyoda-ku (JP)

(72) Inventors: Kazuto Oomori, Chiyoda-ku (JP); Kouki Hayashi, Chiyoda-ku (JP); Osamu Goto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 1030 days.

(21) Appl. No.: 17/044,523

(22) PCT Filed: Feb. 28, 2019

(86) PCT No.: PCT/JP2019/007862
§ 371 (c)(1),
(2) Date: Oct. 1, 2020

(87) PCT Pub. No.: WO2019/202857
PCT Pub. Date: Oct. 24, 2019

(65) Prior Publication Data
US 2021/0224823 A1    Jul. 22, 2021

(30) Foreign Application Priority Data
Apr. 16, 2018  (JP) ................. 2018-078181

(51) Int. Cl.
*G06Q 30/018*  (2023.01)
*G06Q 20/04*   (2012.01)
*G06Q 20/40*   (2012.01)

(52) U.S. Cl.
CPC ..... *G06Q 30/0185* (2013.01); *G06Q 20/0457* (2013.01); *G06Q 20/4014* (2013.01); *G06Q 20/4016* (2013.01)

(58) Field of Classification Search
CPC .......... G06Q 30/0185; G06Q 20/0457; G06Q 20/4014; G06Q 20/4016; G06Q 10/02
See application file for complete search history.

(56) References Cited

U.S. PATENT DOCUMENTS 9,602,961 B2 * 3/2017 Smyrk ................... H04W 4/02
9,710,979 B2 * 7/2017 Moore, Jr. ........... G06K 7/1404
(Continued)

FOREIGN PATENT DOCUMENTS

JP    2005215831 A  *  8/2005
JP       5731726 B1     6/2015
(Continued)

OTHER PUBLICATIONS

Yi, The role of prepurchase browsing behavior in purchase (Year: 2018).*
(Continued)

*Primary Examiner* — Sangeeta Bahl
(74) *Attorney, Agent, or Firm* — Oblon, McClelland, Maier & Neustadt, L.L.P.

(57) ABSTRACT

A mobile terminal apparatus includes: an evaluator configured to, based on pre-purchase information relating to activities of a user during a pre-purchase period before purchase of an electronic ticket and post-purchase information relating to activities of a user during a post-purchase period after the purchase of the electronic ticket, evaluate identicalness of the user during the post-purchase period and a person who purchased the electronic ticket; and a setter configured to set a state relating to validity of the electronic ticket based on a result of the evaluation by evaluator.

7 Claims, 15 Drawing Sheets

(56) References Cited

U.S. PATENT DOCUMENTS

| | | | | |
|---|---|---|---|---|
| 2012/0310829 A1* | 12/2012 | Paulsen | ............ | G06Q 20/4014 |
| | | | | 726/28 |
| 2015/0262195 A1* | 9/2015 | Bergdale | ............ | G06Q 20/3274 |
| | | | | 705/5 |
| 2016/0189153 A1* | 6/2016 | Luk | ............ | G06Q 20/405 |
| | | | | 705/44 |
| 2018/0157984 A1* | 6/2018 | O'Herlihy | ............ | G06N 20/00 |
| 2019/0378185 A1* | 12/2019 | Ito | ............ | G06Q 10/00 |
| 2020/0202317 A1* | 6/2020 | Cassel | ............ | G06Q 30/00 |

FOREIGN PATENT DOCUMENTS

| | | | | |
|---|---|---|---|---|
| JP | 2015-197866 A | | 11/2015 |
| JP | 2017-157223 A | | 9/2017 |
| JP | 2017168032 A | * | 9/2017 |
| JP | 2018026076 A | * | 2/2018 |

OTHER PUBLICATIONS

International Search Report issued on Jun. 4, 2019 in PCT/JP2019/007862 filed on Feb. 28, 2019, 2 pages.

Notice of Reasons for Refusal issued Aug. 10, 2021 in Japanese Patent Application No. 2020-514003 (with English machine translation), 8 pages.

* cited by examiner

FIG. 5

| START TIME INFORMAITON | END TIME INFORMATION | URL |
|---|---|---|
| 2017/6/29 18:01 | 2017/6/29 18:25 | http://abc123··· |
| 2017/6/30 20:08 | 2017/6/30 20:26 | http://adrc48··· |
| 2017/6/30 21:36 | 2017/6/30 21:49 | http://abc123··· |
| 2017/7/1 17:22 | 2017/7/1 17:58 | http://abc123··· |
| 2017/7/1 19:05 | 2017/7/1 19:16 | http://kj859··· |
| 2017/7/1 19:05 | 2017/7/1 19:16 | http://kj859··· |
| ... | ... | ... |

TBL11

FIG. 6

| TIME INFORMATION | WALKING SPEED |
|---|---|
| 2017/6/29 8:05 | 4.1Km/h |
| 2017/6/29 8:10 | 4.2Km/h |
| ... | ... |
| 2017/6/30 18:20 | 4.3Km/h |
| 2017/6/30 18:25 | 4.1Km/h |
| ... | ... |
| 2017/7/1 7:45 | 3.7Km/h |
| 2017/7/1 7:50 | 3.8Km/h |

TBL12

TBL13

| TIME INFO | CELL ID | POSITION INFO |
|---|---|---|
| 2017/6/29 18:05 | AW159 | LATITUDE: 35.70<br>LONGITUDE: 139.98 |
| 2017/6/29 18:10 | AW159 | LATITUDE: 35.70<br>LONGITUDE: 139.98 |
| ... | ... | ... |
| 2017/6/30 8:20 | WQ186 | LATITUDE: 34.61<br>LONGITUDE: 137.72 |
| ... | ... | ... |
| 2017/7/1 7:45 | XZ123 | LATITUDE: 34.85<br>LONGITUDE: 135.61 |
| ... | ... | ... |
| 2017/7/1 18:35 | AW159 | LATITUDE: 35.70<br>LONGITUDE: 139.98 |

MOBILE TERMINAL APPARATUS AND MANAGEMENT APPARATUS

TECHNICAL FIELD

The present invention relates to mobile terminal apparatuses and to management apparatuses.

BACKGROUND ART

As mobile terminal apparatuses such as smartphones have come into widespread use, electronic tickets are being used.

For example, Patent Document 1 discloses a smartphone that downloads an electronic ticket. A user operates such a smartphone to offer the electronic ticket for sale at a ticket sale site and clicks a URL (Uniform Resource Locator) on an incoming mail to acquire the electronic ticket.

In addition, as a countermeasure against illegal resale, an electronic ticket is generally associated with the smartphone by which the user applied for purchase of the electronic ticket, so that only that smartphone can be used.

RELATED ART DOCUMENT

Patent Document

Patent Document 1: Japanese Patent Application Laid-Open Publication No. 2015-197866

SUMMARY OF THE INVENTION

Problem to be Solved by the Invention

However, in recent years, due to lending of a smartphone itself on which an electronic ticket has been downloaded, resale of electronic tickets occurs in which an electronic ticket is illegally resold. Conventionally, the illegal resale of the electronic ticket due to lending or transfer of the smartphone itself has not been considered. The smartphone disclosed in Patent Document 1 can hardly cope with illegal resale.

Means of Solving the Problem

In order to solve the above problem, a mobile terminal apparatus according to a preferred aspect of the present invention includes: an evaluator configured to, based on pre-purchase information relating to activities of a user during a pre-purchase period before purchase of an electronic ticket, and post-purchase information relating to activities of a user during a post-purchase period after the purchase of the electronic ticket, evaluate the identicalness of the user during the post-purchase period and a person who purchased the electronic ticket; and a setter configured to set a state relating to validity of the electronic ticket based on a result of evaluation by the evaluator.

In order to solve the above problem, a management apparatus according to a preferred aspect of the present invention includes: an evaluator configured to, based on pre-purchase information relating to activities of a user during a pre-purchase period before purchase of an electronic ticket, and post-purchase information relating to activities of a user during a post-purchase period after the purchase of the electronic ticket, evaluate identicalness of the user during the post-purchase period and a person who purchased the electronic ticket, wherein the evaluator carries out the evaluation in a case in which the management apparatus receives information that the electronic ticket was purchased by a mobile terminal apparatus carried by a user, and a setter configured to set a state relating to validity of the electronic ticket based on a result of evaluation by the evaluator.

Effect of the Invention

In the present invention, it is possible to reduce or prevent illegal resale of electronic tickets by lending or transfer of a mobile terminal apparatus itself.

BRIEF DESCRIPTION OF THE DRAWINGS

FIG. 5 is a diagram showing an example of Web history information.

FIG. 6 is a diagram showing an example of walking history information.

MODES FOR CARRYING OUT THE INVENTION

1. First Embodiment

Figure 1:
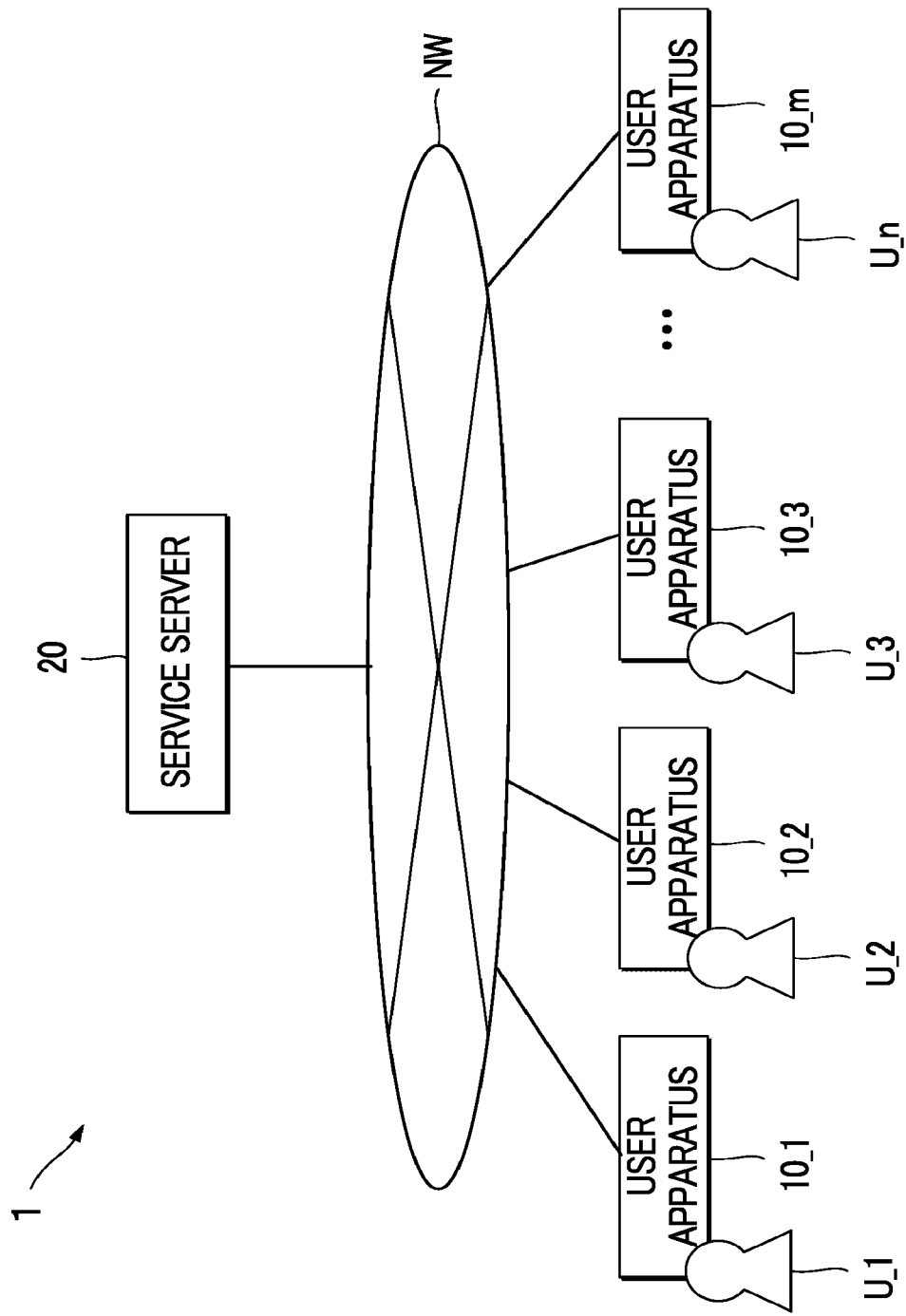
FIG. 1 is a block diagram showing an overall configuration of a service system according to a first embodiment.

FIG. 1 is a block diagram showing an overall configuration of a service system according to a first embodiment. A service system 1 shown in FIG. 1 provides a service relating to electronic tickets.

The service system 1 includes user apparatuses 10_1 to 10_*m* (m is an integer of 1 or more) owned by respective users U_1 to U_n (n is an integer of 1 or more), a network NW, and a service server 20. Each of the user apparatuses 10 is an example of a mobile terminal apparatus. As each user apparatus 10, a portable information terminal such as a smartphone or a tablet terminal is assumed. However, any portable information processing device can be adopted as each user apparatus 10, which may be, for example, a notebook PC or a wearable terminal.

In the following description, unless the n users U_1 to U_n need to be distinguished from each other, any one user is simply referred to as "user U". Similarly, unless the in user apparatuses 10_1 to 10_*m* need to be distinguished from each other, any one user apparatus is simply referred to as "user apparatus 10". In addition, the electronic ticket is a ticket using electronic information. For example, electronic information acquired from the service server 20 is displayed on the user apparatus 10 as an electronic ticket. The electronic ticket is associated with the user apparatus 10. The user apparatus 10 itself storing the electronic ticket is treated as a ticket.

In the service system 1, a user U is able to purchase an electronic ticket from the service server 20 by operating a user apparatus 10. In addition, the user apparatus 10 has a function capable of setting validity of the purchased electronic ticket as a countermeasure against illegal resale due to lending or transfer of the user apparatus 10 itself. Specifically, the user apparatus 10 evaluates the identity of the person who owns the user apparatus 10, using differences in each individual activity after and before purchase of the electronic ticket, and sets a state regarding the validity of the electronic ticket based on the result of the evaluation. In the description, the state regarding the validity of the electronic ticket includes validity of the electronic ticket and invalidity of the electronic ticket. The status "valid" or "invalid" of the electronic ticket can be determined when any preconditions necessary for the determination are satisfied, but the determination of the "valid" or "invalid" status is disabled in a state in which the preconditions are not satisfied. Accordingly, in the description, the state regarding "valid" or "invalid" status of the validity of the electronic ticket may include "pending" in which the determination of the "valid" or "invalid" status is disabled, in addition to the "valid" or "invalid" status.

Figure 2:
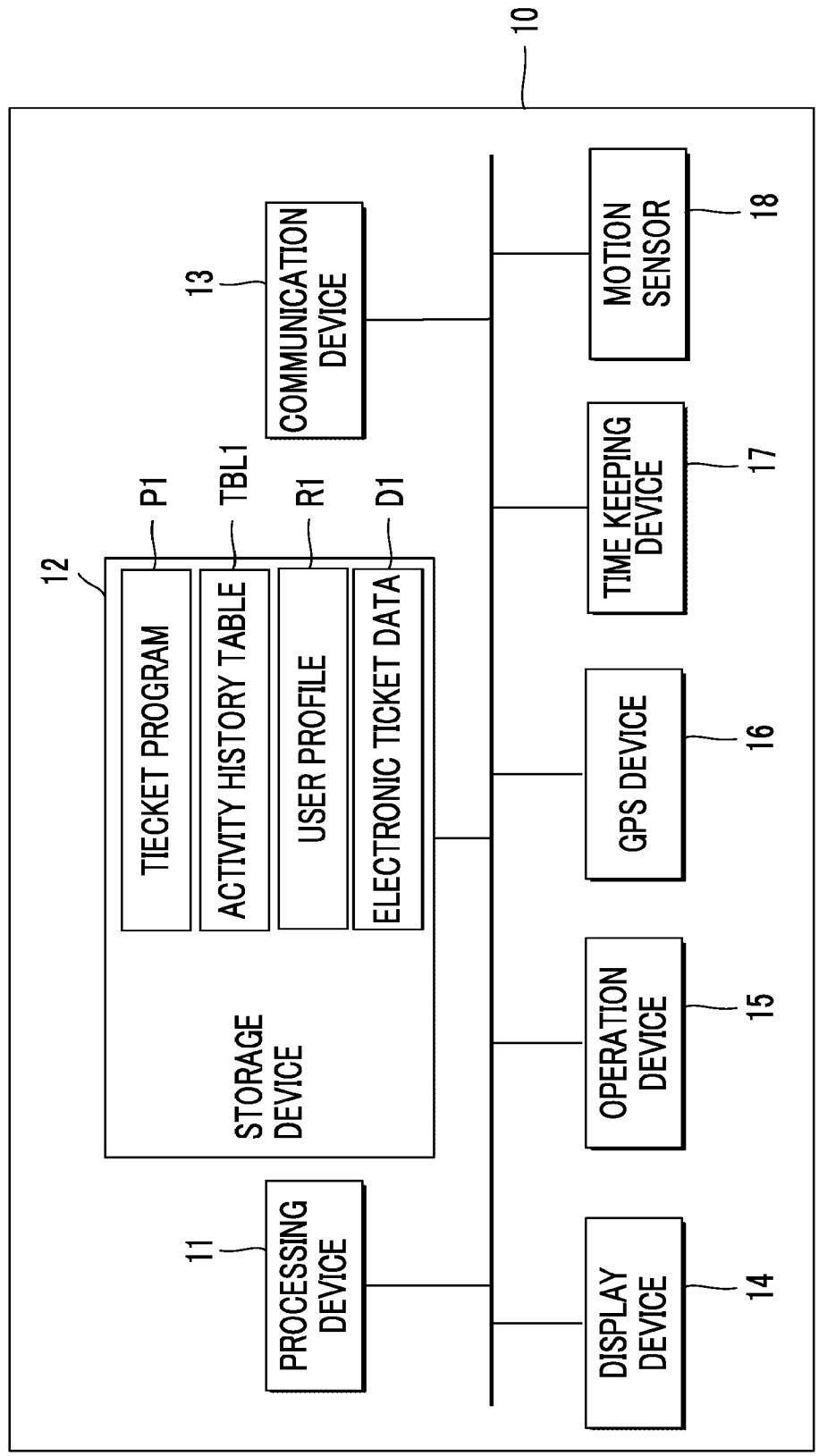
FIG. 2 is a block diagram showing a configuration example of hardware of a user apparatus shown in FIG. 1.

FIG. 2 is a block diagram illustrating a configuration of hardware of the user apparatus. The user apparatus 10 is realized by a computer system including a processing device 11, a storage device 12, a communication device 13, a display device 14, an operation device 15, a GPS (Global Positioning System) device 16, a time keeping device 17, and a motion sensor 18. The components of the user apparatus 10 are connected to each other by a single bus or a plurality of buses. The term "device" denoted in the components of the user apparatus 10 may be replaced with another term such as "circuit", "device", or "unit". In addition, each of the components of the user apparatus 10 includes a single device or a plurality of devices, and some components of the user apparatus 10 may not be provided.

The processing device 11 is a processor that controls the entire user apparatus 10 and includes a single chip or a plurality of chips, for example. The processing device 11 is configured by a central processing unit (CPU) including, for example, an interface with peripheral devices, an arithmetic device, and register. Some or all of functions of the processing device 11 may be realized by hardware such as DSP (Digital Signal Processor), ASIC (Application Specific Integrated Circuit), PLD (Programmable Logic Device), or FPGA (Field Programmable Gate Array). The processing device 11 executes various processing in parallel or sequentially.

The storage device 12 is a recording medium that can be read by the processing device 11, and stores programs executed by the processing device 11 and various data used by the processing device 11. The storage device 12 includes, for example, one or more types of storage circuits such as ROM (Read Only Memory), EPROM (Erasable Programmable ROM), EEPROM (Electrically Erasable Programmable ROM), and RAM (Random Access Memory).

Specifically, the storage device 12 stores programs including a ticket program P1 (ticket application) executed by the processing device 11. The ticket program P1 is downloaded in advance from the service server 20 or the like when a user U purchases an electronic ticket. The ticket program P1 may be provided from external devices (not shown) other than the service server 20. In addition, the storage device 12 stores various data such as an activity history table TBL1, a user profile R1, and electronic ticket data D1. The activity history table TBL1, the user profile R1, and the electronic ticket data D1 are data acquired or generated when the processing device 11 executes the ticket program P1, and are used by the processing device 11 at the time of execution of the ticket program P1.

The communication device 13 is a device that communicates with other devices via a network NW such as a mobile communication network or the Internet. The communication device 13 may also be called, for example, a network device, a network controller, a network card, or a communication module. The communication device 13 is communicable with, for example other user apparatuses 10 and the service server 20 via the network NW.

The display device 14 displays various images under the control of the processing device 11. For example, various display panels such as a liquid crystal display panel and an organic EL (electro-luminescence) display panel are preferably used as the display device 14.

The operation device 15 is a device for inputting information used by the user apparatus 10 to the processing device 11. The operation device 15 receives an operation from the user U. Specifically, the operation device 15 receives an operation for inputting symbols such as numbers or characters and an operation for selecting icons displayed on the display device 14. For example, the operation device 15 preferably includes a touch panel that detects contact with a display screen of the display device 14. The operation device 15 may include operators that can be operated by the user U.

The GPS device 16 receives radio waves from satellites and generates position information from the received radio waves. The position information may be in any format as long as a position is specified. The position information indicates, for example, latitude and longitude of the user apparatus 10. As illustrated in the present embodiment, the position information is obtained from the GPS device 16, but the user apparatus 10 may acquire position information using any method. For example, the user apparatus 10 acquires, as position information, a cell ID allocated to a base station serving as a communication destination of the user apparatus 10. The cell ID is identification information for uniquely identifying the base station. Furthermore, when the user apparatus 10 communicates with an access point of a wireless LAN, the user apparatus acquires position information with reference to a database in which an identification address (Media Access Control (MAC) address) on a network allocated to the access point is associated with an actual address (position).

The time keeping device 17 generates time information representative of the current time. Specifically, the time keeping device 17 counts pulse signals obtained by division of a clock signal generated by a crystal oscillator or the like, to generate time information.

The motion sensor 18 detects acceleration and inclination of the user apparatus 10. The motion sensor 18 is configured by a combination of an acceleration sensor and a gyro sensor, for example.

Figure 3:
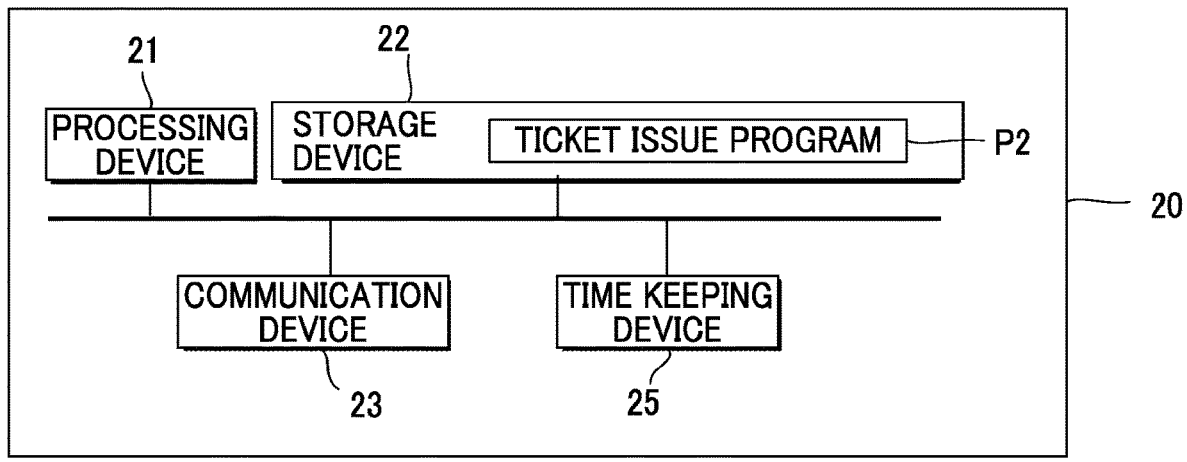
FIG. 3 is a block diagram showing a configuration example of hardware of a service server shown in FIG. 1.

FIG. 3 is a block diagram showing a configuration example of hardware of the service server shown in FIG. 1. The service server 20 is realized by a computer system including a processing device 21, a storage device 22, a communication device 23, and a time keeping device 25. The components of the service server 20 are connected to each other by a single bus or a plurality of buses. The term "device" denoted in the components of the service server 20 may be replaced with another term such as "circuit", "device", or "unit". In addition, each of the components of the service server 20 includes a single device or a plurality of devices, and some components of the service server 20 may not be provided.

The processing device 21 has a configuration similar to that of the processing device 11. The storage device 22 has a configuration similar to that of the storage device 12. The communication device 23 has a configuration similar to that of the communication device 13. The time keeping device 25 has a configuration similar to that of the time keeping device 17. However, the storage device 22 differs from the storage device 12 in terms of storing a ticket issue program P2 executed by the processing device 21. The processing device 21 executes the ticket issue program P2, and issues an electronic ticket to a user apparatus 10 that has transmitted a purchase request indicating an application for purchase of the electronic ticket.

Figure 4:
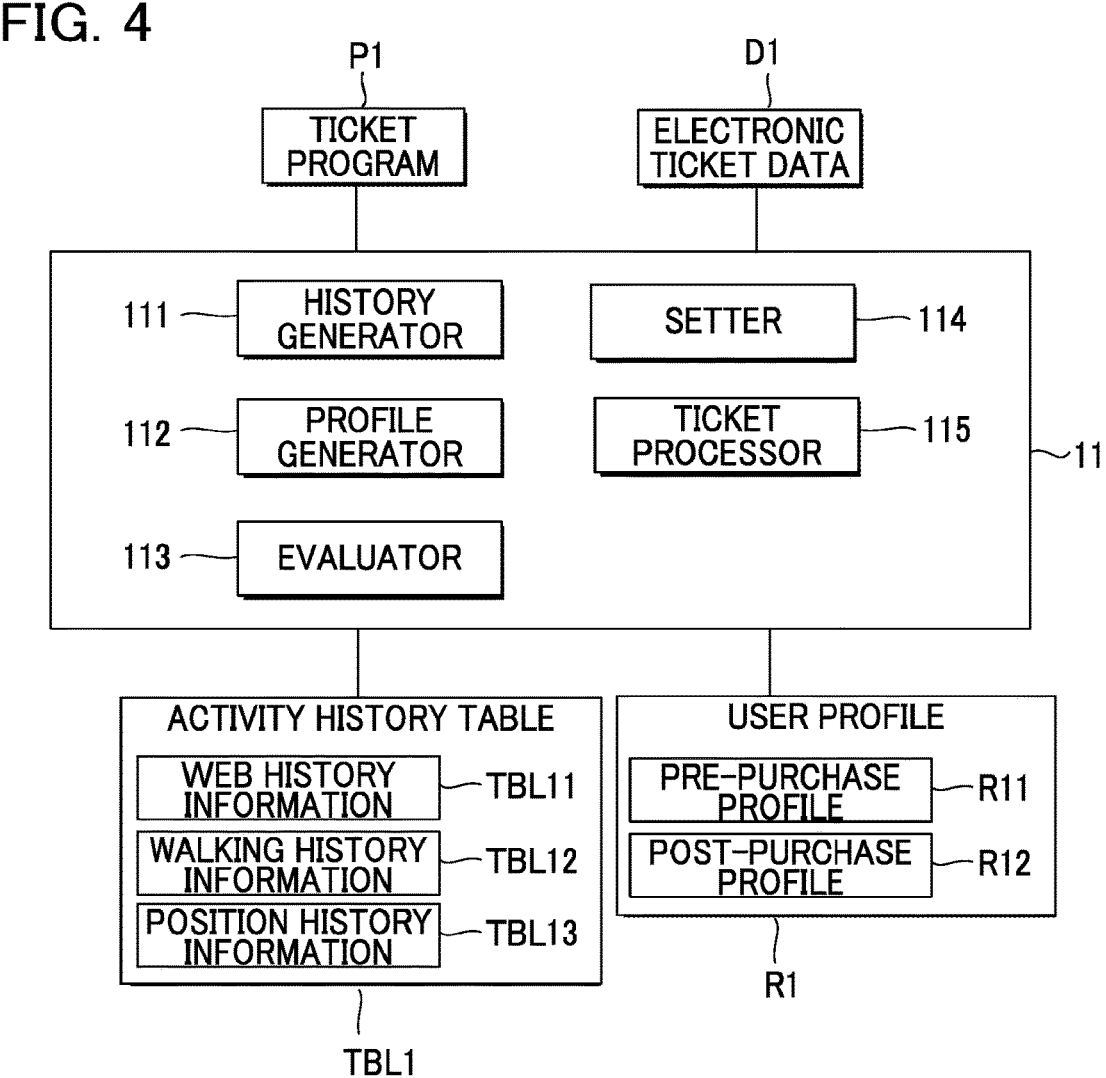
FIG. 4 is a functional block diagram showing a functional configuration example of the user apparatus shown in FIG. 1.

FIG. 4 is a functional block diagram showing a functional configuration example of the user apparatus shown in FIG. 1. The processing device 11 of the user apparatus 10 reads and executes the ticket program P1 from the storage device 12, thereby functioning as a history generator 111, a profile generator 112, an evaluator 113, a setter 114, and a ticket processor 115.

The history generator 111 generates an activity history of the user U, and stores the generated activity history in an activity history table TBL1. The activity history table TBL1 includes Web history information TBL11, walking history information TBL12, and position history information TBL13. The Web history information TBL11, the walking history information TBL12, and the position history information TBL13 are examples of the plurality types of activity history information included in the activity history table TBL1.

FIG. 5 is a diagram showing an example of the Web history information. The Web history information TBL11 shown in FIG. 5 is information in which URL of a webpage browsed by the user U, start time information indicating time (date and time) when the browsing of the webpage starts, and end time information indicating time when the browsing of the webpage ends, are associated with each other. The URL of the web page is acquired from, for example, a web browser. The time information is output from the time keeping device 17. FIG. 5 shows an example in which a user U browses a webpage of URL "http://abc123 . . . " from the time "2017/6/29 18:01" indicated by the start time information to the time "2017/6/29 18:25" indicated by the end time information.

FIG. 6 is a diagram showing an example of walking history information. The walking history information TBL12 shown in FIG. 6 is information in which a walking speed of a user U is associated with time information indicating time during walking. The walking speed is calculated based on a signal indicating acceleration output from the motion sensor 18. The time information is output from the time keeping device 17. FIG. 6 shows an example in which the user U is moving at a walking speed of "4.1 k/m" at time "2017/6/29 8:05" indicated by the time information. FIG. 6 exemplifies the walking speed, but does not exemplify information relating to movement of vehicles such as cars and trains. However, information relating to such movement may be generated. In other words, instead of the walking history information, movement history information may be used in which a moving speed of the user U and time information indicating time when the user is moving are associated with each other.

Figures 7, 8:
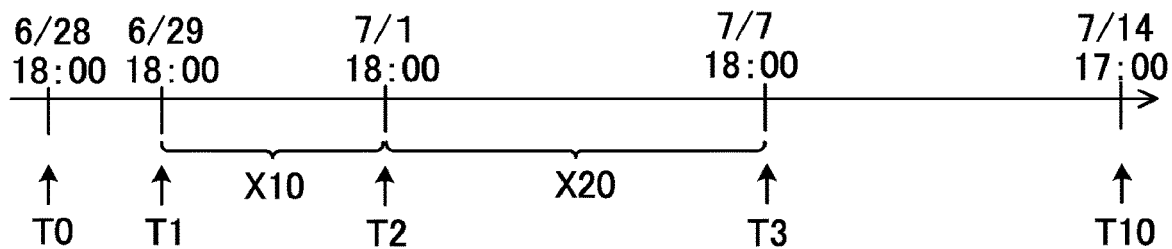
FIG. 7 is a diagram showing an example of position history information.
FIG. 8 is a diagram showing a time flow regarding a purchase of an electronic ticket.

FIG. 7 is a diagram showing an example of position history information. The position history information TBL13 shown in FIG. 7 is information in which a position of a place at which the user U stays and time information indicating time at which the user stays at the place at which the user stays, are associated with each other. The position of the place at which the user stays is output from the GPS device 16 or the like, and the time information is output from the time keeping device 17. FIG. 7 shows an example in which the user U is located in a cell ID "AW159" at time "2017/6/29 18:05" indicated by the time information and is staying at a position latitude: 35.70, longitude: 139.98" indicated by the position information.

In the activity history table TBL1, any one of the web history information TBL11, the walking history information TBL12, and the position history information TBL13 may not be presented, and the activity history table TBL1 may include the activity history information as well as these types of information.

Here, an example of a flow related to purchase of an electronic ticket of a user U will be described with reference to FIG. 8. FIG. 8 is a diagram showing a time flow regarding purchase of an electronic ticket. In FIG. 8, "T0" indicates download time of a ticket program P1, "T1" indicates application time for an electronic ticket, "T2" indicates acquisition time of electronic ticket data D1, and "T10" indicates use time of the electronic ticket. FIG. 8 shows an example in which the user U downloads a user profile R1 at the download time T0 "2017/6/28 18:00" and applies for a desired electronic ticket at the application time T1 "2017/6/29 18:00". In addition, an example is shown in which the user U acquires electronic ticket data D1 from the service server 20 at the acquisition time T2 "2017/7/1 18:00" and uses the electronic ticket at the use time T10 "2017/7/14 17:00".

The purchase of the electronic ticket is completed when the user U receives the electronic ticket under the condition of having paid the price. The payment of the price includes payment in real time and so-called deferred payment, in which the price is paid on a predetermined date after agreement about payment of the price. In the description, "purchase time of the electronic ticket" means acquisition time T2 at which the user apparatus 10 acquires the electronic ticket data D1 from the service server 20. In other words, the payment of the price may be real-time settlement or settlement by deferred payment, regardless of the settlement time.

In FIG. 8, "X10" indicates a pre-purchase period from the application time T1 to the acquisition time T2, and "X20" indicates a post-purchase period from the acquisition time T2 to determination time T3. The determination time T3 is a timing to determine identicalness of a user in the post-purchase period X20, which will be described below, and a person who purchased the electronic ticket. The determination time T3 is freely selectable, and is one week prior to the use time T10 in the example shown in FIG. 8.

The profile generator 112 shown in FIG. 4 generates the user profile R1 based on the activity history table TBL1. The user profile R1 is an activity history indicating a characteristic of a user U. The user profile R1 includes a pre-purchase profile R11 indicating an activity characteristic of a user U in the pre-purchase period X10 and a post-purchase profile R12 indicating activity characteristic of a user U in the post-purchase period X20. In the following description, a user U who owns a certain user apparatus 10 before purchasing the electronic ticket is referred to as "user Ux", and a user U who owns the user apparatus 10 after purchasing the electronic ticket is referred to as "user Uy". It is assumed that the user Ux may be a same person as the user Uy, or may be a different person other than the same person as the user Uy.

Figure 9:
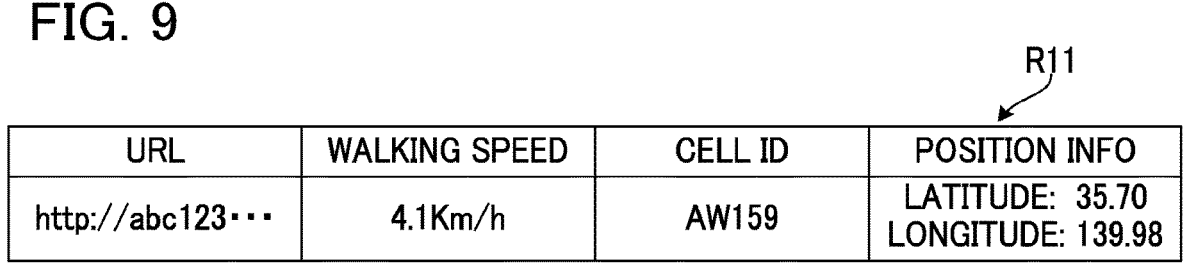
FIG. 9 is a diagram showing an example of a pre-purchase profile.

FIG. 9 is a diagram showing an example of a pre-purchase profile. The pre-purchase profile R11 shown in FIG. 9 is an example of "pre-purchase information" relating to activities of a user Ux. The pre-purchase profile R11 is generated based on contents stored in the activity history table TBL1 in the pre-purchase period X10. In addition, the pre-purchase profile R11 includes the characteristics of the user Ux. In the example shown in FIG. 9, the pre-purchase profile R11 includes, for example, a webpage that is frequently browsed by the user Ux, an average walking speed of the user Ux, a cell ID of a cell in which the user apparatus 10 of the user Ux is most frequently located, and position information on a place where the user Ux visits most frequently. Therefore, the pre-purchase profile R11 is also an example of "pre-purchase characteristic information" indicating the characteristic of the user Ux. In the example shown in the drawing, the pre-purchase profile R11 includes four types of characteristics. However, any number of types of characteristics may be selected as long as the included contents represent characteristics of the user Ux. The webpage may be a URL with the largest number of pageviews, instead of the URL that is browsed most frequently.

Figure 10:
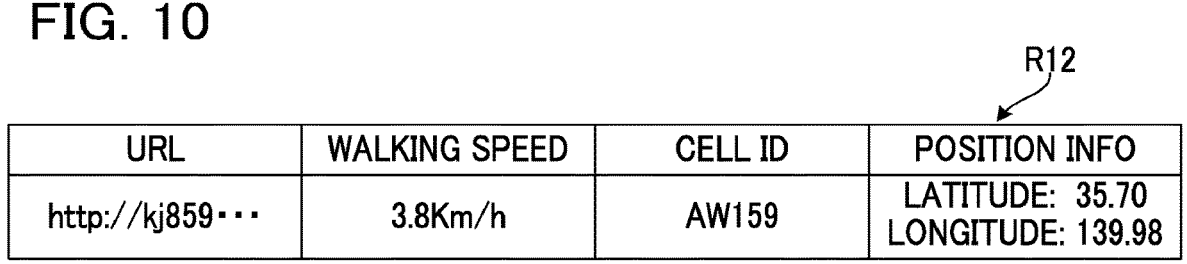
FIG. 10 is a diagram showing an example of a post-purchase profile.

FIG. 10 is a diagram showing an example of a post-purchase profile. The post-purchase profile R12 shown in FIG. 10 is an example of "post-purchase information" relating to activities of a user Uy. The post-purchase profile R12 is generated based on contents stored in the activity history table TBL1 in the post-purchase period X20. In addition, the post-purchase profile R12 includes the characteristics of the user Uy. In the example shown in FIG. 9, the post-purchase profile R12 includes, for example, a webpage that is frequently browsed by the user Uy, an average walking speed of the user Uy, a cell ID of a cell in which the user apparatus 10 of the user Uy is most frequently located, and position information at a place the user Uy visits most frequently. Therefore, the post-purchase profile R12 is also an example of "post-purchase characteristics information" indicating the characteristics of the user Uy. It is of note that the number of types of characteristics may be any selected as long as the contents included in the post-purchase profile R12 represent characteristics of the user Uy. Furthermore, the webpage may be a URL with the greatest number of pageviews, instead of the URL that is browsed most frequently.

The evaluator 113 shown in FIG. 4 evaluates the identicalness of the user Uy and the person who purchased the electronic ticket based on the pre-purchase profile R11 and the post-purchase profile R12. As described above, the user Ux is the user U who owns the user apparatus 10 before purchasing the electronic ticket. Therefore, the person who purchased the electronic ticket is the user Ux. Thus, the identicalness of the user Uy and the person who purchased the electronic ticket can be evaluated by comparison between the pre-purchase profile R11 and the post-purchase profile R12.

The setter 114 sets a state relating to validity of the electronic ticket based on a result of the evaluation by the evaluator 113. Examples of the state relating to the validity of the electronic ticket include a valid state of the electronic ticket and an invalid state of the electronic ticket. When the electronic ticket becomes valid, the user Uy can use the electronic ticket. For example, when the electronic ticket is a ticket for admission to a concert, the user Uy can enter a concert hall using the valid electronic ticket. On the other hand, when the electronic ticket is invalid, the user Uy cannot use the electronic ticket. In this case, the user Uy cannot enter the concert hall using the invalid electronic ticket. The state in which the electronic ticket is invalid includes, for example, a state in which the electronic ticket data D1 is deleted, or a state in which the electronic ticket is not settled and cannot be used.

The ticket processor 115 performs various processing related to the electronic ticket. The ticket processor 115 performs, for example, application for purchase of the electronic ticket to the service server 20, acquisition of the electronic ticket data D1, settlement relating to the purchase of the electronic ticket, and a display of the electronic ticket on the display device 14. Furthermore, the display device 14 displays an image indicating information included in the electronic ticket. For example, the image is an image of a two-dimensional code such as a QR code (registered trademark).

Figure 11:
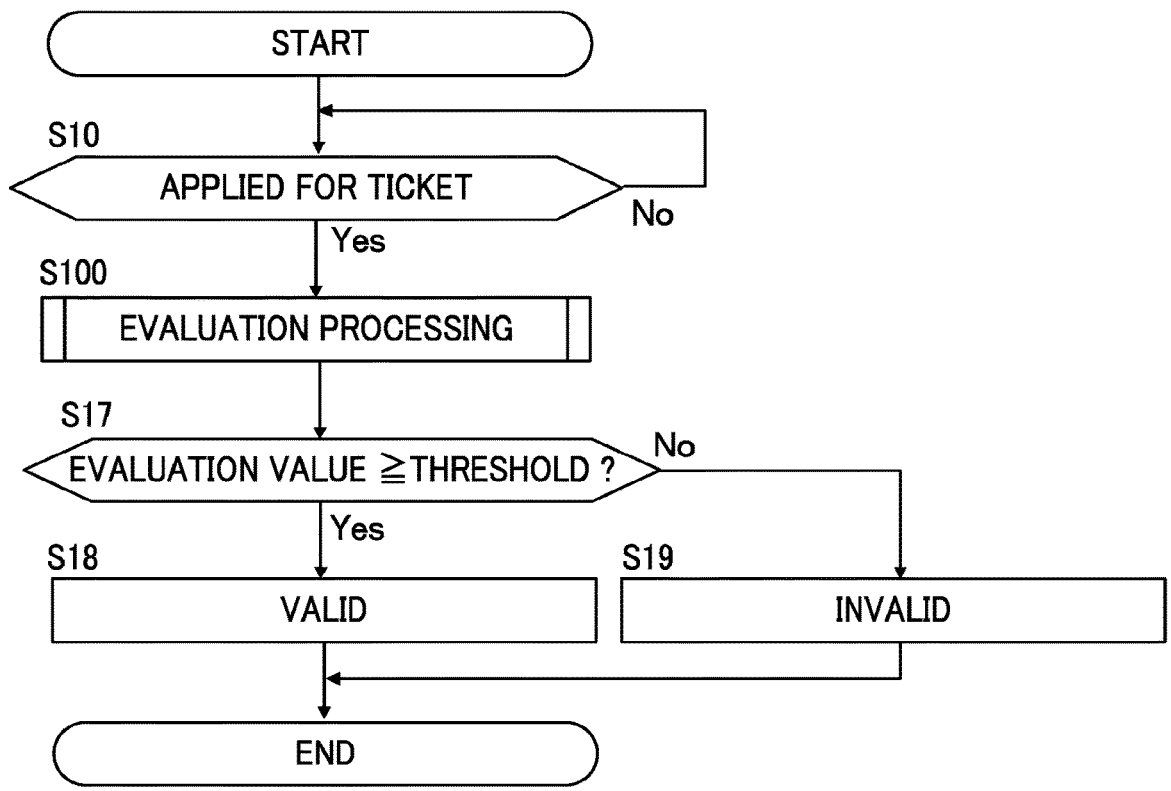
FIG. 11 is a flowchart showing an example of validity setting processing of an electronic ticket in a user apparatus.

An operation of the user apparatus 10 will be described below. FIG. 11 is a flowchart showing an example of validity setting processing of an electronic ticket in a user apparatus 10. When processing device 11 executes the ticket program P1 read from the storage device 12, the validity setting processing is executed.

First, the ticket processor 115 determines whether user U has applied for an electronic ticket using the operation device 15 (S10). The determination is repeated until an application is made. For example, when the user U activates the ticket program P1 and taps an application button displayed on the display device 14, the ticket processor 115 determines that the application for the electronic ticket has been made based on a signal indicating the operation of the user U output from the operation device 15. When the user U applies for the electronic ticket using the operation device 15, the processing device 11 executes evaluation processing (S100).

Figure 12:
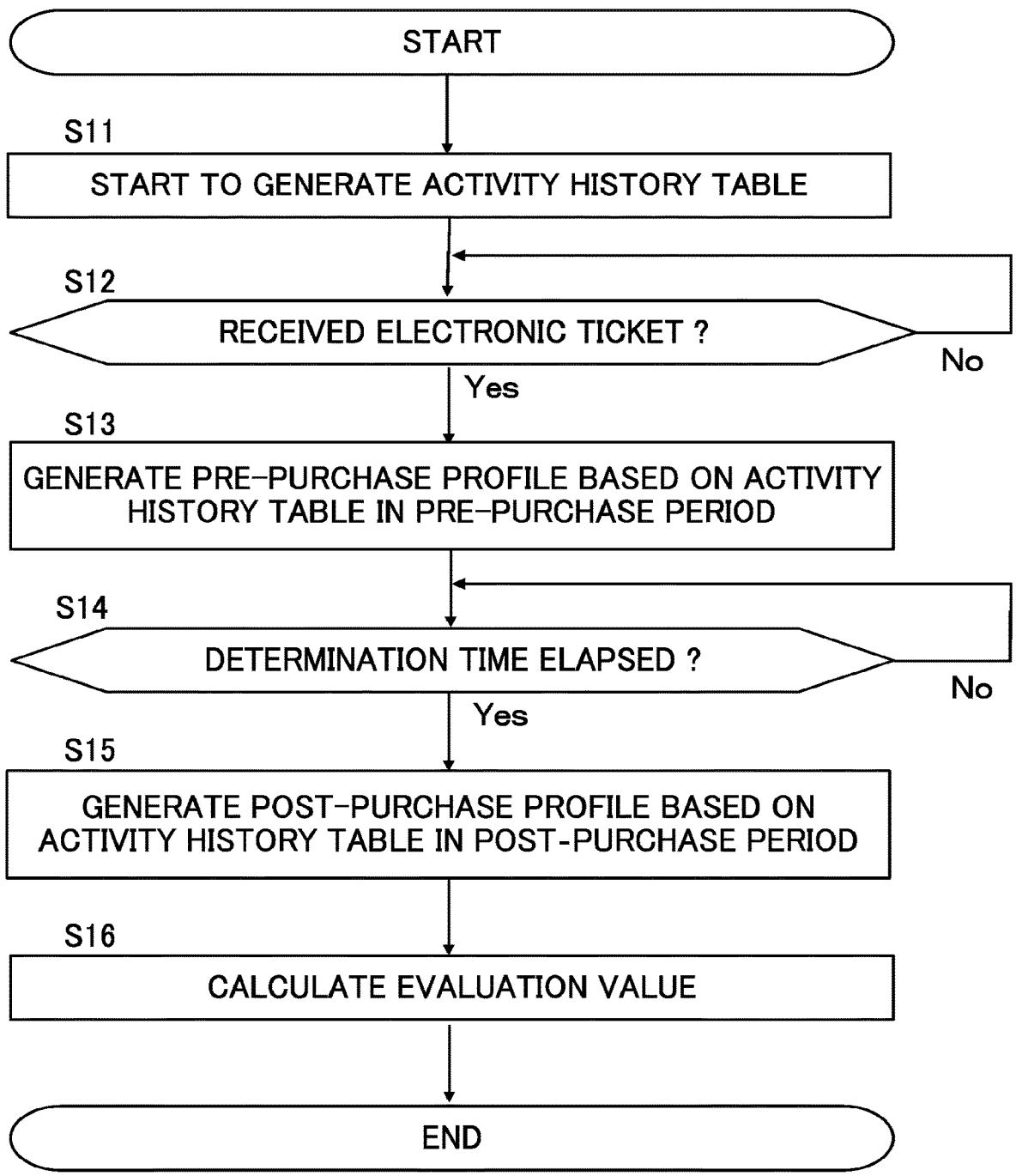
FIG. 12 is a flowchart showing an example of evaluation processing showing in FIG. 11.

FIG. 12 is a flowchart showing an example of the evaluation processing shown in FIG. 11. When the evaluation processing is started, the history generator 111 starts generating the activity history table TBL1 (S11). The history generator 111 classifies activities of the user U for each type of the user's activity based on signals from the GPS device 16, the time keeping device 17, and the motion sensor 18, thereby generating the web history information TBL11, the walking history information TBL12, and the position history information TBL13, which are described above. It is assumed that the generation processing of the activity history table TBL1 is executed by the history generator 111 until the validity setting processing ends.

Next, the profile generator 112 determines whether the communication device 13 has received the electronic ticket data D1 from the service server 20 (S12). The determination is repeated until the communication device 13 receives the electronic ticket data D1. When the communication device 13 receives the electronic ticket data D1 (S12: Yes), the profile generator 112 generates a pre-purchase profile R11 based on the activity history table TBL1 (S13). Specifically, the profile generator 112 extracts the activity history information in the pre-purchase period X10 from the activity history table TBL1 in the pre-purchase period X10, and identifies the activity representing the characteristic of the user Ux. More specifically, the profile generator 112 identifies the URL of the webpage that is browsed most frequently, the cell ID that is communicated most frequently, and the position information that was most frequent in the pre-purchase period X10, for example. In addition, the profile generator 112 calculates the average walking speed of the user Ux in the pre-purchase period X10. Then, the profile generator 112 generates the pre-purchase profile R11 using the specified information.

Next, the profile generator 112 determines, based on the signal from the time keeping device 17, whether the determination time T3 has elapsed (S14). The determination is repeated until the determination time T3 elapses. When the determination time T3 has elapsed (S14: Yes), the profile generator 112 generates the post-purchase profile R12 based on the activity history table TBL1 (S15). Specifically, the profile generator 112 extracts the activity history information in the post-purchase period X20 from the activity history table TBL1 in the post-purchase period X20, and identifies the activity representing the characteristics of the user Uy. The profile generator 112 identifies the URL of the webpage that is browsed most frequently, the cell ID that is communicated most frequently, and the position information that is stayed at most frequently in the post-purchase period X20, for example. In addition, the profile generator 112 calculates the average walking speed of the user Uy in the post-purchase period X20. Then, the profile generator 112 generates the post-purchase profile R12 using the specified information.

Subsequently, the evaluator 113 evaluates the identicalness of the user Uy and the person who purchased electronic ticket based on the pre-purchase profile R11 and the post-purchase profile R12. First, the evaluator 113 calculates an evaluation value indicating the degree of similarity between the pre-purchase profile R11 and the post-purchase profile R12 (S16). For example, an evaluation value F is given by an evaluation function indicated in Equation 1.

$$F=\alpha 1 * f1(x1,y1) + \alpha 2 * f2(x2,y2) + \alpha 3 * f3(x3,y3) \quad \text{Equation 1}$$

Where, $\alpha 1$, $\alpha 2$, $\alpha 3$ are coefficients; x1 and y1 are parameters related to the URL of the webpage; x2 and y2 are parameters related to the walking speed; and x3 and y3 are parameters related to the cell ID. The function $f1(x1, y1)$ has a value of "1" when x1 and y1 match, and has a value of "0" when they do not match. The function $f2(x2, y2)$ has a value of "1" when $2.05 > (x2^2+y2^2)/(x2y2) > 1.95$, has a value of "0.8" when $2.1 > (x2^2+y2^2)/x2y2 \geq 2.05$ or $1.95 \geq (x2^2+y2^2)/x2y2 > 1.9$, and has a value of "0" in other cases. The function $f3(x3, y3)$ has a value of "1" when x3 and y3 match, has a value of "0.8" when x3 and y3 are cell IDs of cells adjacent to each other, and has a value of "0" in other cases.

Here, it is assumed that (A is equal to 0.8, $\alpha 2$ is equal to 1.2, and $\alpha 3$ is equal to 1. In this case, the evaluation value F is calculated based on the pre-purchase profile R11 shown in FIG. 9 and the post-purchase profile R12 shown in FIG. 10. Since $f1(x1, y1)$ is equal to 0, $f2(x2, y2)$ is equal to 1, and $f3(x3, y3)$ is equal to 1, the evaluation value F has a value of "2.2" (F=0.8*0+1.2*1+1*1). The calculation method of the evaluation value is not particularly limited to the example described above, and any evaluation function may be used.

Returning to FIG. 11, the evaluator 113 determines whether the evaluation value obtained in step S16 is equal to or greater than a threshold (S17). When the evaluation value is equal to or greater than the threshold and the determination result is affirmative (S17: Yes), the setter 114 makes the electronic ticket valid (S18). In other words, the setter 114 makes the electronic ticket valid when the identicalness of the person who purchased the electronic ticket and the user Uy is high. On the other hand, when the evaluation value is less than the threshold and the determination result is negative (S17: No), the setter 114 invalidates the electronic ticket (S19). In other words, the setter 114 invalidates the electronic ticket when the identicalness of the person who purchased the electronic ticket and the user Uy is low.

Although no flowchart is shown, when the electronic ticket is set to be valid by the setter 114 (S18), the ticket processor 115 causes the display device 14 to display the electronic ticket, for example. When the electronic ticket is displayed, the user U can use the electronic ticket. For example, the dedicated terminal provided in an entrance gate of a concert hall reads the electronic ticket displayed on the user's display device whereby the user U can enter the concert hall. On the other hand, when the electronic ticket is set to be invalid by the setter 114 (S19), the ticket processor 115 deletes or disables the electronic ticket data D1, for example. When the electronic ticket data D1 is deleted or disabled, the user U cannot use the electronic ticket.

As described above, the user apparatus 10, that is, an example of the "mobile terminal apparatus" includes: the evaluator 113 that evaluates the identicalness of user Uy and a person who purchased an electronic ticket in the post-purchase period X20; and the setter 114 that sets a state related to the validity of the electronic ticket based on a result of the evaluation of the evaluator 113. As described above, when the electronic ticket is purchased, the evaluator 113 evaluates the above-described identity based on the pre-purchase profile R11 as "pre-purchase information" relating to activities of a user Ux in the pre-purchase period X10 and the post-purchase profile R12 as "post-purchase information" relating to activities of the user Uy in the post-purchase period X20.

In the user apparatus 10, since the evaluator 113 is provided, it is possible to evaluate the identicalness of the person who purchased the electronic ticket (a subscriber of the user apparatus 10) and the user Uy in the post-purchase period X20, using different activities for the individuals. Further, in the user apparatus 10, since the setter 114 is provided, for example, it is possible to make the electronic ticket invalid when it is determined that the person who purchased the electronic ticket has lent or transferred the user apparatus 10 itself to a person other than the purchaser, after purchasing the electronic ticket. Therefore, it is possible to reduce or prevent illegal resale of the electronic ticket by lending or transfer of the user apparatus 10 itself. When the user apparatus 10 determines that the identicalness of the person who purchased the electronic ticket and the user Uy is high, as described above, the electronic ticket is validated. In this case, the user Uy can use the electronic ticket.

As described above, the evaluator 113 calculates the evaluation value based on the pre-purchase profile R11 as "pre-purchase information" and the post-purchase profile R12 as "post-purchase information". In addition, the setter 114 compares the evaluation value with the threshold and sets the state relating to the validity of the electronic ticket.

The identicalness of the person who purchased the electronic ticket and the user Uy can be quantitatively determined by comparison between the evaluation value and the threshold. In addition, the threshold, which is an evaluation criterion for identicalness, is freely selectable depending on the type of electronic ticket, for example. For example, a high-priced electronic ticket may have a higher threshold than a low-priced electronic ticket. In step S17, the setter 114 validates the electronic ticket when the evaluation value exceeds the threshold and the evaluation value is equal to the threshold in the determination of the evaluator 113. However the setter 114 may validate the electronic ticket only when the evaluation value exceeds the threshold.

As described above, the setter 114 invalidates the electronic ticket when the evaluation value is less than the threshold. When the evaluation value is less than the threshold, examples of the state relating to the validity of the electronic ticket set by the setter 114 include a pending state as well as the invalid state. When the identity is not clear by the comparison between the evaluation value and the threshold, the setter sets the electronic ticket to be in the invalid state rather than in the pending state. Thus, illegal resale can be properly reduced or prevented.

Furthermore, in the present embodiment, the pre-purchase profile R11 is the pre-purchase characteristics information that is generated based on the activities of the user Ux in the pre-purchase period X10 to characterize the user Ux.

Since the pre-purchase profile R11, which is the pre-purchase characteristics information, reflects the characteristics of the user Ux, it is possible to evaluate the identicalness of the user Uy in the post-purchase period and the person who purchased the electronic ticket, depending on whether the activity after the purchase of the electronic ticket corresponds to the characteristics of the user Ux. As a result, the identicalness can be evaluated with high accuracy.

In addition, in the present embodiment, the post-purchase profile R12 is the post-purchase characteristics information that is generated based on the activities of the user Uy in the post-purchase period X20 to characterize the user Uy. The identity is evaluated by the comparison between the pre-purchase profile R11, which is the pre-purchase characteristic information, and the post-purchase profile R12 which is the post-purchase characteristic information. Thus, the identity can be evaluated with higher accuracy.

In the present embodiment, the identity is evaluated based on the pre-purchase profile R11 and the post-purchase profile R12. However, the identicalness may be evaluated based on the activity history table TBL1 in the pre-purchase period X10 and the activity history table TBL1 in the post-purchase period X20. In this case, the activity history information relating to the pre-purchase period X10 in the activity history table TBL1 corresponds to the "pre-purchase information". The activity history information relating to the post-purchase period X20 in the activity history table TBL1 corresponds to the "post-purchase information".

The first embodiment has been described above. The first embodiment can be variously modified. A specific modification applicable to the first embodiment described above will be exemplified below. In the modification described below, differences from the first embodiment described above will mainly be described, and similar matters will not be described. In the drawings referred to in the following modification, the same reference numerals are given to the same components as those in the above-described embodiment.

Modifications

Figure 13:
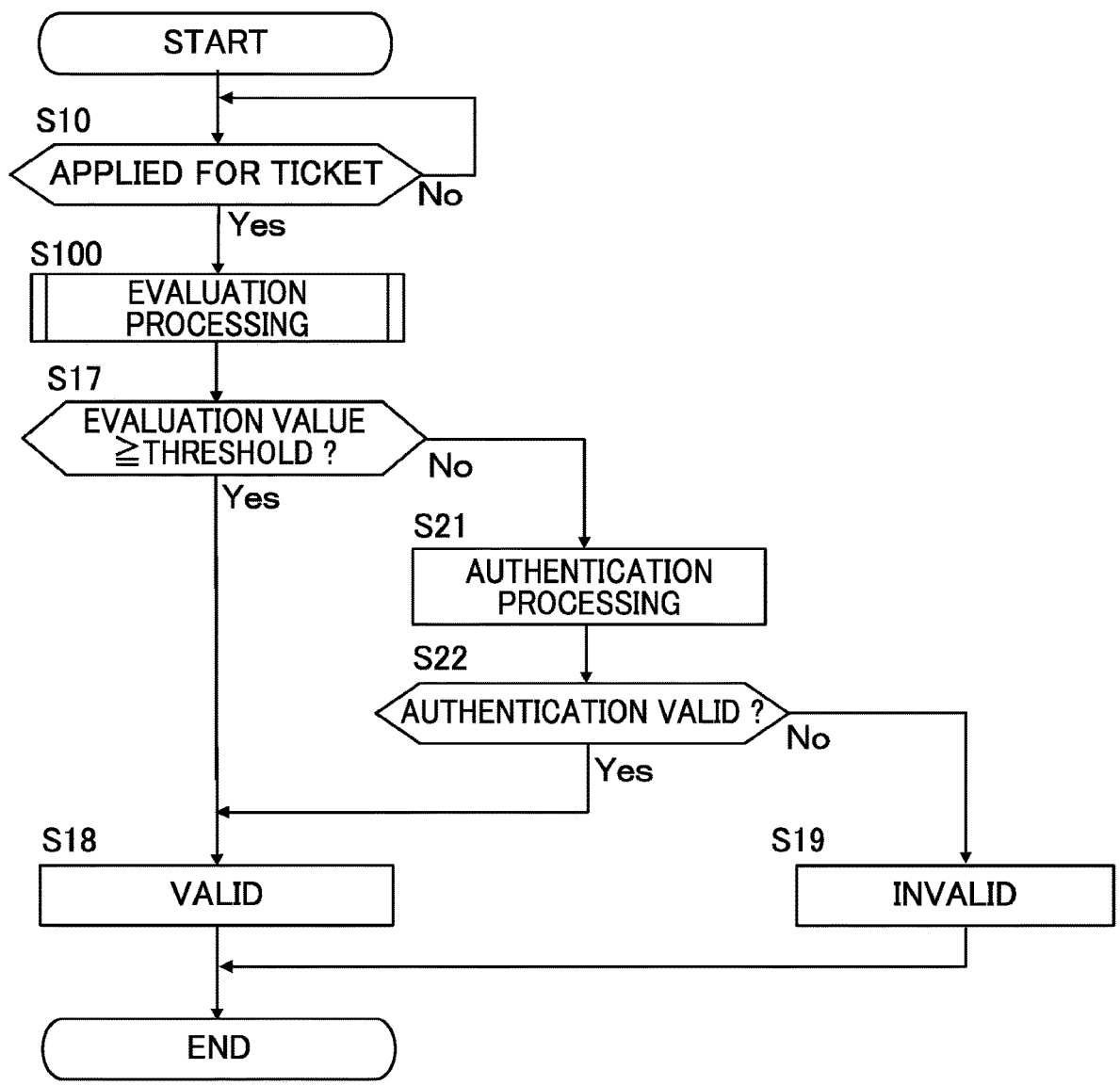
FIG. 13 is a flowchart showing a modification of the validity setting processing.

FIG. 13 is a flowchart showing validity setting processing according to a first modification. In the validity setting processing shown in FIG. 13, when the evaluator 113 determines in step S17 that the evaluation value is not equal to or greater than the threshold (No), the setter 114 executes authentication processing for the user U (S21). Examples of the authentication processing include authentication processing accompanied by input of an ID and a password and authentication processing such as fingerprint authentication using biometric information. Then, the setter 114 determines whether the authentication is successful (S22), and the setter validates the electronic ticket (S18) when the authentication is valid (S22: Yes). When the authentication fails (S22: No), the setter invalidates the electronic ticket (S19).

As described above, the setter 114 executes user authentication of the user U when the evaluation value is less than the threshold, and validates the electronic ticket when the user authentication is successful. With such setting, it is possible to avoid invalidating the electronic ticket despite the fact that the person who purchased the electronic ticket and the user U in the post-purchase period X20 are the same person. In the first embodiment, when a possibility that a user Ux and a user Uy are the same person is low, the electronic ticket will be invalidated. In this case, for example, when a person who purchased an electronic ticket goes on a trip after acquiring the electronic ticket data D1 and the person behaves differently from normal days, the electronic ticket may be invalidated, despite the person being the same person. However, according to the first modification, such a problem can be solved.

An example of the authentication processing includes processing for asking a user Uy a question regarding activities in the pre-purchase period X10. Specifically, the setter 114 generates a correct answer of the user Uy for one or more questions regarding the activities in the pre-purchase period X10 when the evaluation value is less than the threshold. The setter 114 acquires the answer of the user Uy and compares the acquired answer with the correct answer, thereby determining whether the answer is correct or incorrect. Thereafter, the setter 114 sets the state relating to the validity of the electronic ticket depending on the determination result obtained by the determination.

For example, the setter 114 generates one question, validates the electronic ticket when the answer from the user Uy is correct, and invalidates the electronic ticket when the answer from the user Uy is incorrect. In addition, for example, the setter 114 generates questions, validates the electronic ticket when a right answer rate from the user Uy is equal to or greater than a predetermined value. The setter 114 invalidates the electronic ticket when the right answer rate from the user Uy is less than the predetermined value. The predetermined value is freely selectable depending on the type of electronic ticket, for example.

A person who knows the activities of the user Ux in the pre-purchase period X10 has a high probability of being the same as the user Ux in the pre-purchase period X10. Therefore, in the modification described above, even when the evaluation value is less than the threshold, since the state regarding the validity of the electronic ticket is set depending on the answer to the question regarding the activities of the user Ux in the pre-purchase period X10, it is possible to avoid invalidating the electronic ticket despite the fact that the person who purchased the electronic ticket and the user Uy are the same person.

2. Second Embodiment

A second embodiment of the present invention will be described below. A user apparatus 10 according to the present embodiment is mainly similar to the user apparatus 10 according to the first embodiment except that the state regarding the validity of the electronic ticket is pending and additional processing is performed when the evaluation value is less than the threshold. In the following description, differences of the second embodiment from the first embodiment described above will be mainly described, and similar matters will not be described. Although the description is given below with reference to FIGS. 14, 15, and 16, in these drawings, the same reference numerals are given to the same components as those in the above-described embodiment. The matters in the above-described modification are also applicable to the present embodiment.

Figure 14:
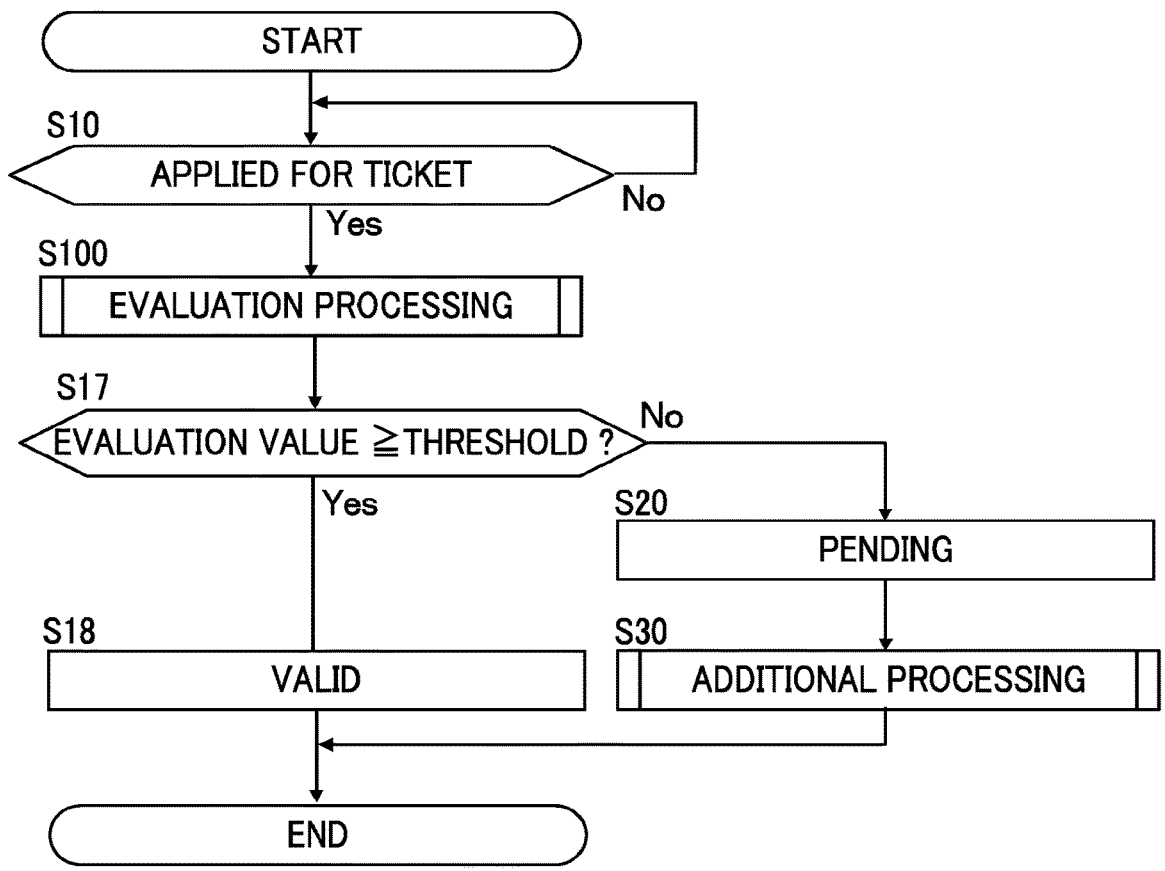
FIG. 14 is a flowchart showing an example of validity setting processing according to a second embodiment.

FIG. 14 is a flowchart showing an example of validity setting processing according to the second embodiment. In the present embodiment, when the evaluator 113 determines that the evaluation value is not equal to or greater than the threshold (S17: No), the setter 114 sets the state regarding the validity of the electronic ticket to a pending state (S20). Next, the processing device 11 executes additional processing (S30).

Figure 15:
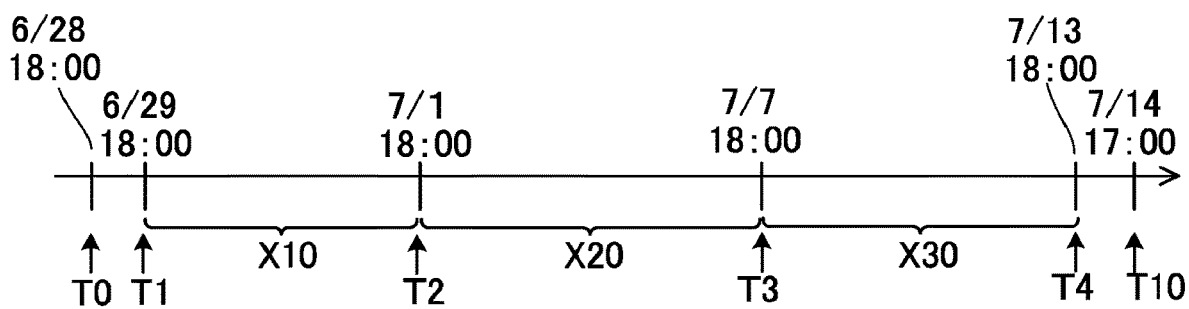
FIG. 15 is a diagram showing a time flow regarding a purchase of an electronic ticket according to the second embodiment.

Here, an example of a flow related to the purchase of the electronic ticket by the user U in the present embodiment will be described with reference to FIG. 15. FIG. 15 is a diagram showing a time flow regarding purchase of an electronic ticket in the second embodiment. In FIG. 15, "T4" indicates additional determination time in the additional processing (S30), and "X30" indicates an additional period that is a period from the determination time T3 to the additional determination time T4. The additional period X30 is freely selectable. In the example shown in FIG. 15, the additional period X30 is six days from the determination time T3. Therefore, the additional determination time T4 is six days after the determination time T3. In the following description, a "user Uz" is a user U who owns the user apparatus 10, which is owned by the user Ux in the pre-purchase period X10, in the additional period X30.

Figure 16:
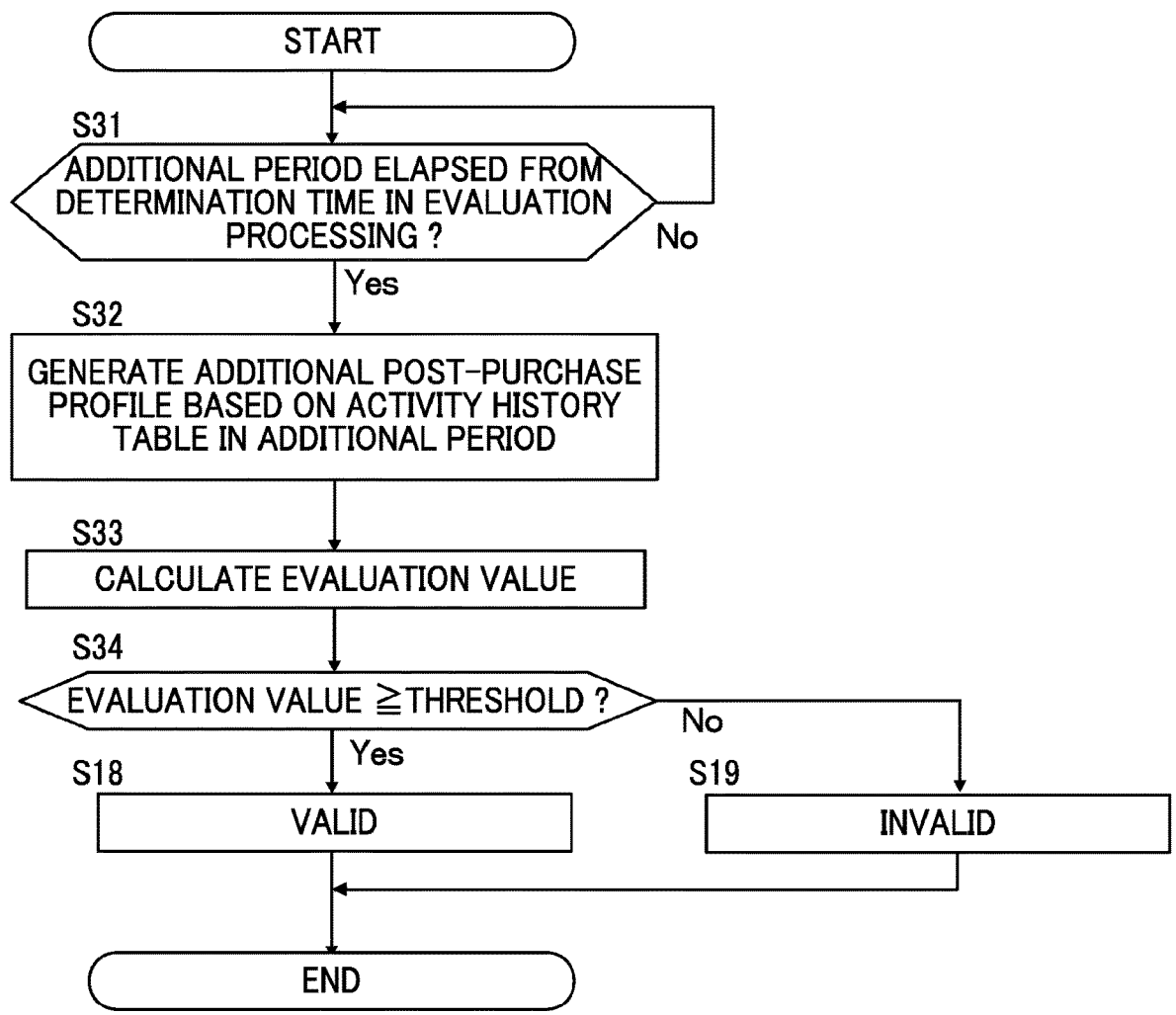
FIG. 16 is a flowchart showing an example of additional processing shown in FIG. 14.

FIG. 16 is a flowchart showing an example of the additional processing shown in FIG. 14. First, the history generator 111 determines whether the additional period X30 has elapsed from the determination time T3 in the evaluation processing (S100 in FIG. 14) (S31). The determination is repeated until the additional period X30 elapses. When the additional period X30 has elapsed (S31: Yes), the profile generator 112 generates an additional post-purchase profile R12 based on an activity history table TBL1 in the additional period X30 (S32). Next, the evaluator 113 calculates an evaluation value for evaluating identicalness of the user Uz and the person who purchased the electronic ticket based on a pre-purchase profile R11 and the additional post-purchase profile R12 (S33). The method of calculating the evaluation value is not particularly limited, and for example, the method described in the evaluation processing S100 can be used.

Next, the evaluator 113 determines whether the evaluation value is equal to or greater than the threshold (S34). When the evaluator 113 determines that the evaluation value is equal to or greater than the threshold (S34: Yes), the setter 114 validates the electronic ticket (S18). On the other hand, when the evaluator 113 determines that the evaluation value is not equal to or greater than the threshold (S34: No), the setter 114 invalidates the electronic ticket (S19). The threshold used in step S34 may be equal to or different from the threshold used in step S17 shown in FIG. 14.

As described above, according to the present embodiment, when the evaluator 113 determines (S17: No) that identicalness of the user Uy and the person who purchased an electronic ticket is not clear in the determination (S17) of the evaluation value after the evaluation processing (S100), the setter 114 sets the state regarding the validity of the electronic ticket to a pending state (S20). For example, the setter 114 sets the electronic ticket to a pending state. Then, the processing device 11 executes the additional processing, and validates the electronic ticket when the identicalness of the user Uz and the person who purchased the electronic ticket becomes clear. For example, the settlement of the electronic ticket is completed, and the electronic ticket can be used. With such additional processing, for example, even when the person who purchased the electronic ticket behaves differently from normal days immediately after acquiring the electronic ticket data D1, the electronic ticket may be validated when the identity is again clarified. Therefore, it is possible to reduce the probability that an electronic ticket will be invalidated despite the person being the same.

In the second embodiment as described above, similarly to the first embodiment, it is possible to reduce or prevent illegal resale of the electronic ticket by lending or transfer of the user apparatus 10 itself.

3. Third Embodiment

A third embodiment of the present invention will be described below. A user apparatus 10 according to the present embodiment is mainly similar to the user apparatus 10 according to the first embodiment except that post-purchase profile generation and evaluation of identity are repeated multiple times. In the following description, differences of the third embodiment from the first embodiment described above will be mainly described, and similar matters will not be described. Moreover, although the description is given below with reference to FIGS. 17 and 18, in these drawings, the same reference numerals are given to the same components as those in the above-described embodiment. The matters in the modification and the second embodiment described above are also applicable to the present embodiment.

Figure 17:
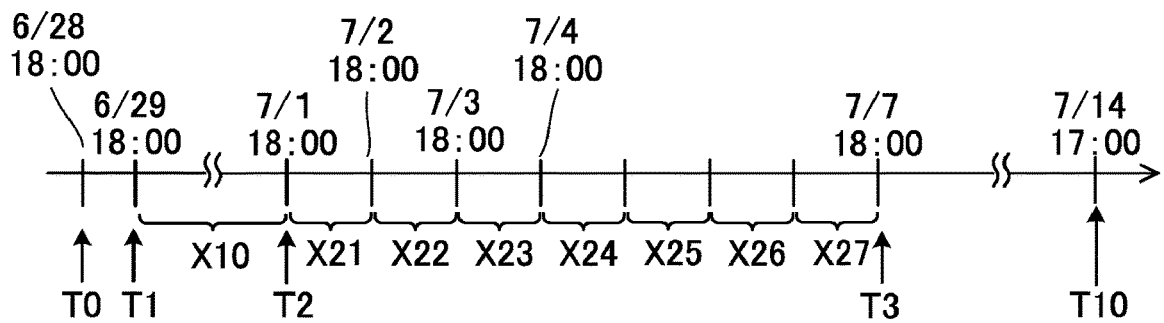
FIG. 17 is a diagram showing a time flow regarding a purchase of an electronic ticket according to a third embodiment.

An example of a flow related to purchase of an electronic ticket of the user U according to the present embodiment will be described with reference to FIG. 17. FIG. 17 is a diagram showing a time flow regarding purchase of an electronic ticket according to the third embodiment. In the example shown in FIG. 17, identity is evaluated after each of post-purchase periods X21, X22, X23, X24, X25, X26, and X27 from acquisition time T2, which is purchase time, to determination time T3 has elapsed. Each of the post-purchase periods X21 to X27 can be set as appropriate, and it is one day in the example shown in FIG. 17.

Figure 18:
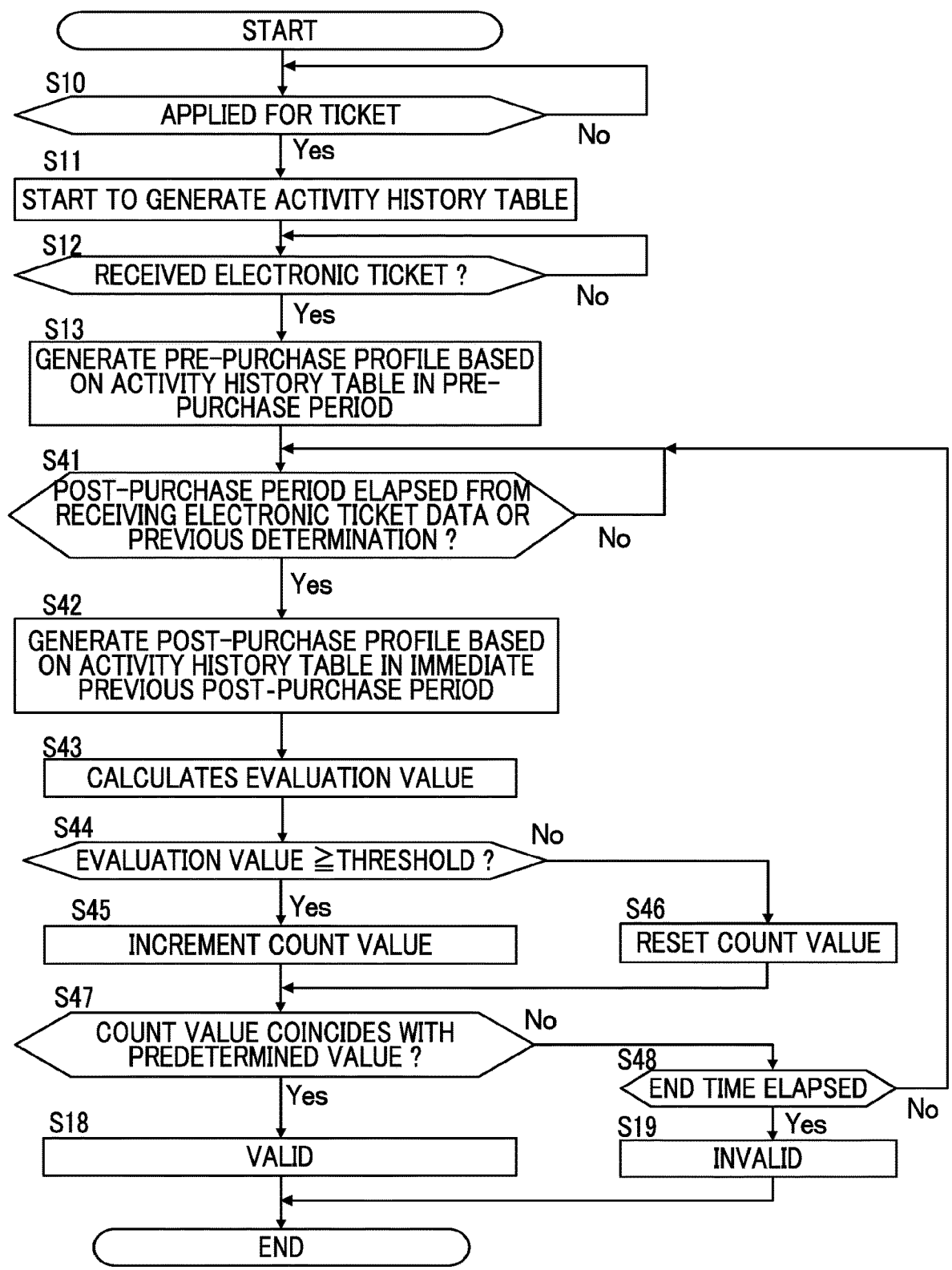
FIG. 18 is a flowchart showing an example of validity setting processing according to the third embodiment.

FIG. 18 is a flowchart showing an example of validity setting processing according to the third embodiment. The profile generator 112 generates a pre-purchase profile R11 (S13), and then determines whether the post-purchase period X21 has elapsed from the acquisition time T2 at which electronic ticket data D1 is received (S41). The determination is repeated until the post-purchase period X21 elapses. The profile generator 112 generates a post-purchase profile R12 based on an activity history table TBL1 in the post-purchase period X21 (S42) when the post-purchase period X21 has elapsed (S41: Yes).

Subsequently, the evaluator 113 calculates an evaluation value for evaluating identicalness of the user Uy and the person who purchased the electronic ticket based on the pre-purchase profile R11 and the post-purchase profile R12 (S43). Subsequently, the evaluator 113 determines whether the evaluation value is equal to or greater than a threshold (S44). When determining that the evaluation value is equal to or greater than the threshold (S44: Yes), the evaluator 113 increments a count value compared with a predetermined value in a determination in step S47, to be described below (S45). The count value is reset when a ticket program P1 is activated. On the other hand, the evaluator 113 resets the count value when determining that the evaluation value is not equal to or greater than the threshold (S44: No) (S46).

Subsequently, the evaluator 113 determines whether the count value coincides with the predetermined value (S47). When the evaluator 113 determines that the count value coincides with the predetermined value (S47: Yes), the setter 114 validates the electronic ticket (S18). The predetermined value is freely selectable. In the example shown in FIG. 18, the predetermined value is "3". Therefore, even when the evaluation value is equal to or greater than the threshold twice consecutively, the count value is reset to zero when the evaluation value is less than the threshold in a third determination. In other words, when the evaluation value is equal to or greater than the threshold three times or more consecutively, the setter 114 validates the electronic ticket.

On the other hand, when the evaluator 113 determines that the count value does not match the predetermined value (S47: No), the evaluator 113 determines whether determination time T3 has elapsed (S48). When the determination time T3 has elapsed (S48: Yes), the setter 114 invalidates the electronic ticket (S19). In other words, the setter 114 invalidates the electronic ticket, because the determination result of the identity is not affirmed consecutively in the post-purchase periods X21 to X27 even though the identity is evaluated multiple times.

When the evaluator 113 determines that the determination time T3 has not elapsed (S48: No), the process returns to step S41. Then, the profile generator 112 determines whether the next post-purchase period X22 has elapsed from the previous determination time, that is, the determination time in the previous step S44 (S41). In step S41, for example, when the previous determination time is after the elapse of the post-purchase period X22, it is determined whether the next post-purchase period X23 has elapsed. Similarly, for example, when the previous determination time is after the elapse of the post-purchase period X23, it is determined whether the next post-purchase period X24 has elapsed. Accordingly, when the above-described evaluation value is determined until the determination time T3 in the example of FIG. 17 (S44), seven post-purchase profiles R12 are generated.

In the example shown in FIG. 17, the post-purchase periods X21 to X27 have the same length of time, but the post-purchase periods X21 to X27 may have different lengths of time. Therefore, in the example shown in FIG. 18, the post-purchase profile R12 is periodically generated with lapse of time, but the post-purchase profile R12 may be irregularly generated with lapse of time. The number of post-purchase periods X21 to X27 is not limited to seven, and may be freely selected.

As described above, the post-purchase profile R12, which is "post-purchase information", is repeatedly generated over time. In addition, as described above, every time the post-purchase profile R12 is repeatedly generated, the evaluator 313 evaluates identicalness of a user U in the post-purchase periods X21 to X27 and a person who purchased the electronic ticket, based on the pre-purchase profile R11 and the newly generated post-purchase profile R12.

Since the identity is evaluated using the post-purchase profile R12 that is repeatedly generated over time, it is possible to invalidate the electronic ticket even when the person who purchased the electronic ticket lends or transfers the electronic ticket to another person immediately after the purchase or after a while. Thus, illegal resale can be reduced or prevented, regardless of the lending or transfer time.

In the third embodiment as described above, similarly to the first embodiment, it is also possible to reduce or prevent the illegal resale of the electronic ticket due to lending or transfer of the user apparatus 10 itself.

4. Fourth Embodiment

A fourth embodiment of the present invention will be described below. A user apparatus 10 according to the present embodiment is mainly similar to the user apparatus 10 according to the third embodiment, except that reference information profile is mainly used. In the following description, differences of the fourth embodiment from the third embodiment described above will be mainly described, and similar matters will not be described. Although the description is given below with reference to FIGS. 19 to 22, in these drawings, the same reference numerals are given to the same components as those in the above-described embodiment. The matters in the modification, the first embodiment, and the second embodiment described above are also applicable to the present embodiment.

In the present embodiment as in the third embodiment, the evaluation of identity is also sequentially repeated multiple times over time. However, the present embodiment differs from the third embodiment in terms of a period to be compared in an evaluation value calculation (S43).

Figure 19:
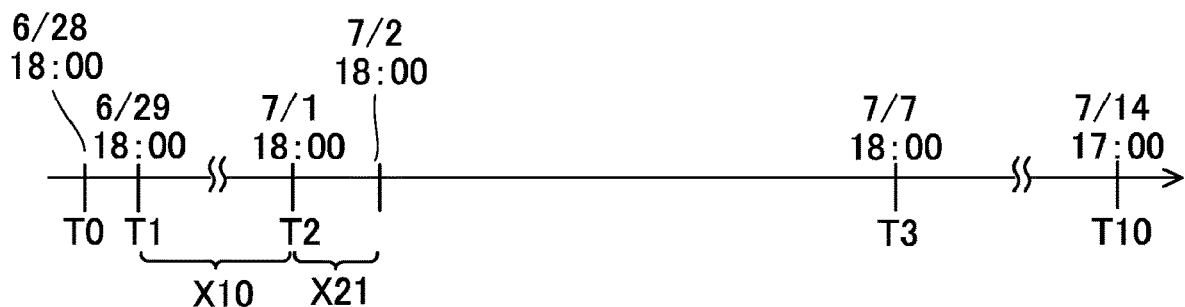
FIG. 19 is a diagram illustrating a post-purchase period according to a fourth embodiment.
Figure 20:
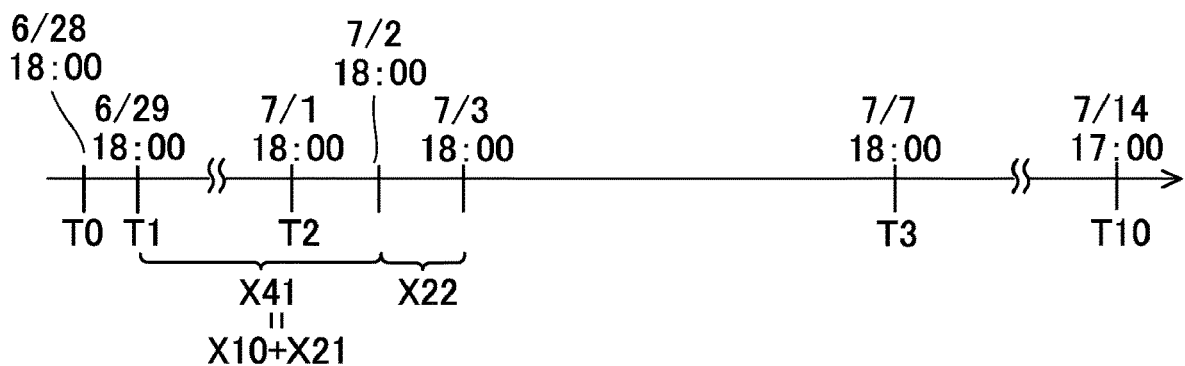
FIG. 20 is a diagram illustrating a post-purchase period according to the fourth embodiment.
Figure 21:
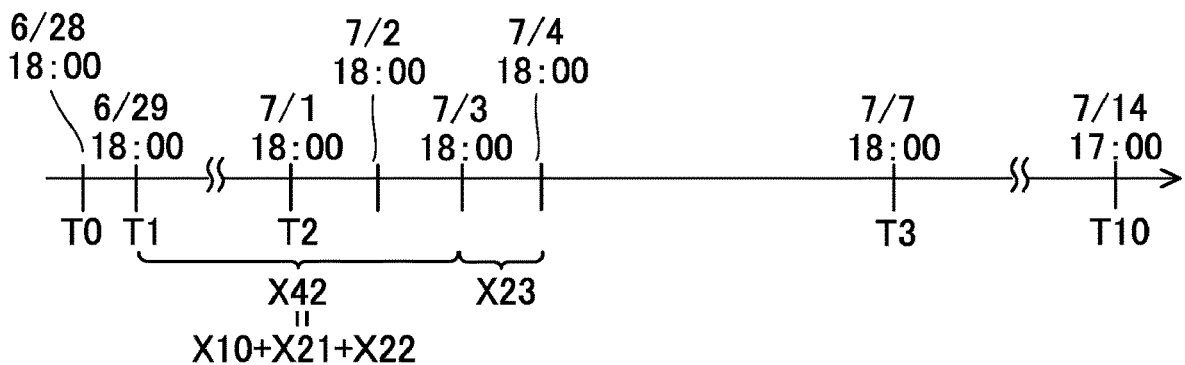
FIG. 21 is a diagram illustrating a post-purchase period according to the fourth embodiment.

Each of FIGS. 19, 20, and 21 is a diagram illustrating a post-purchase period according to the fourth embodiment. In the present embodiment, as shown in FIG. 19, periods to be compared in a first evaluation value calculation are a pre-purchase period X10 and a post-purchase period X21. In addition, as shown in FIG. 20, periods to be compared in a second evaluation value calculation are a reference period X41 and a post-purchase period X22. The reference period X41 is a period obtained by addition of the pre-purchase period X10 and the post-purchase period X21. Furthermore, as shown in FIG. 21, periods to be compared in a third evaluation value calculation are a reference period X42 and a post-purchase period X23. The reference period X42 is a period obtained by addition of the pre-purchase period X10, the post-purchase period X21, and the post-purchase period X22.

Figure 22:
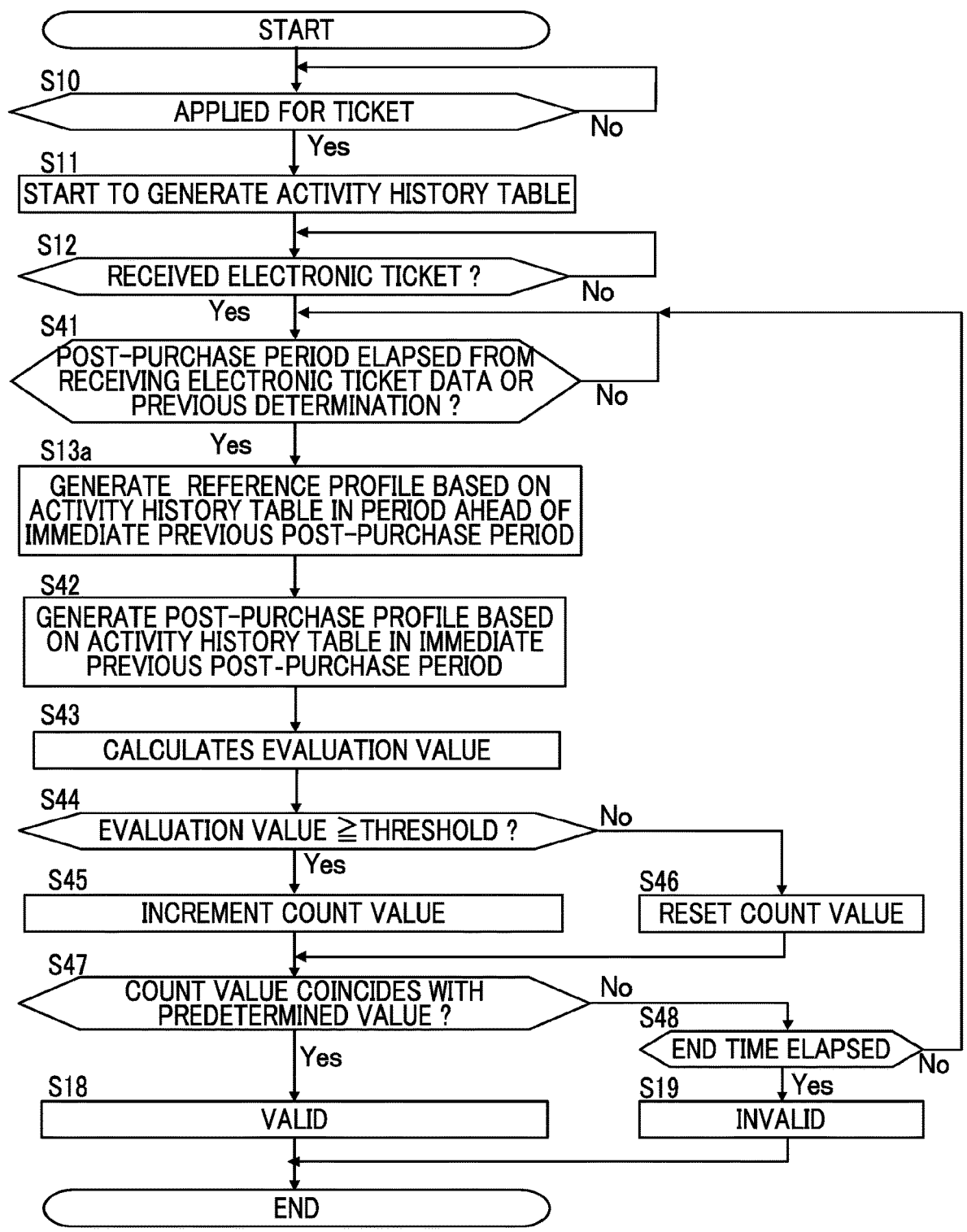
FIG. 22 is a flowchart showing an example of validity setting processing according to the fourth embodiment.

FIG. 22 is a flowchart showing an example of validity setting processing according to the fourth embodiment. In the example shown in FIG. 19, when electronic ticket data D1 is received (S12: Yes), the profile generator 112 determines whether the post-purchase period X21 has elapsed (S41). When the post-purchase period X21 has elapsed (S41: Yes), the profile generator 112 generates a pre-purchase profile R11 based on an activity history table TBL1 in the pre-purchase period X10, which is a period ahead of the immediate previous post-purchase period X21 (S13a). Subsequently, the profile generator 112 generates a post-purchase profile R12 in the post-purchase period X21 based on the activity history table TBL1 in the post-purchase period X21 (S42). Then, the evaluator 113 calculates an evaluation value based on the pre-purchase profile R11 and the post-purchase profile R12 in the post-purchase period X21 (S43), and compares the evaluation value with a threshold (S44). The evaluator 113 evaluates identicalness based on such comparison.

In the example of FIG. 20, when the next post-purchase period X22 has elapsed from the previous determination time, that is, the determination time in preceding step S44 (S41: Yes), the profile generator 112 generates a reference profile based on the activity history table TBL1 in the reference period X41 which is a period ahead of the post-purchase period X22 (S13a). In this example, the reference profile is a profile (not shown) representing characteristics of the user U in the reference period X41. Subsequently, the profile generator 112 generates a post-purchase profile R12 in the post-purchase period X22 based on the activity history table TBL1 in the post-purchase period X22 (S42). Then, the evaluator 113 calculates an evaluation value based on the reference profile in the reference period X41 and the post-purchase profile R12 in the post-purchase period X22 (S43), and then compares the evaluation value with the threshold (S44). The evaluator 113 evaluates the identity based on such comparison.

In the example of FIG. 21, when the next post-purchase period X23 has elapsed from the previous determination time, that is, the determination time in preceding step S44 (S41: Yes), the profile generator 112 generates a reference profile based on the activity history table TBL1 in the reference period X42 which is a period ahead of the post-purchase period X23 (S13a). In this example, the reference profile is a profile (not shown) representing characteristics of the user U in the reference period X42. Subsequently, the profile generator 112 generates a post-purchase profile R12 in the post-purchase period X23 based on the activity history table TBL1 in the post-purchase period X23 (S42). Then, the evaluator 113 calculates an evaluation value based on the reference profile in the reference period X42 and the post-purchase profile R12 in the post-purchase period X23 (S43), and then compares the evaluation value with the threshold (S44). The evaluator 113 evaluates the identicalness based on such comparison.

As described above, in the example shown in FIG. 20, the evaluator 113 evaluates the identicalness based on the reference profile (reference information) relating to activities of a user U in the reference period X41 and the post-purchase profile R12 relating to activities of a user U in the post-purchase period X22 that is newer than the post-purchase period X21. In the example shown in FIG. 20, the reference period X41 includes the pre-purchase period X10 and the post-purchase period X21, and the post-purchase period X21 corresponds to a "post-purchase reference period of the electronic ticket". In the example of FIG. 21, the evaluator 113 evaluates the identity based on the reference profile relating to activities of a user U in the reference period X42 and the post-purchase profile R12 relating to activities of a user U in the post-purchase period X23 that is newer than the post-purchase periods X21 and X22. In the example shown in FIG. 20, the reference period X42 includes the pre-purchase period X10, the post-purchase period X21, and the post-purchase period X22. Each of the post-purchase periods X21 and X22 corresponds to "post-purchase reference periods of the electronic ticket".

In the present invention, it is possible to reduce or prevent illegal resale regardless of the lending or transfer time of the user apparatus 10 by comparing, over the lapse of time, the reference profile in the reference period X41 or X42 including the characteristics of the user U in the post-purchase period with the latest post-purchase profile R12.

In the fourth embodiment as described above, similarly to the first embodiment, it is also possible to reduce or prevent illegal resale of the electronic ticket due to lending or transfer of the user apparatus 10 itself.

5. Fifth Embodiment

A fifth embodiment of the present invention will be described below. A service system 1A according to the present embodiment is similar to the user apparatus 10 according to the first embodiment except that validity setting processing is performed by a management server 30 instead of the user apparatus 10. In the following description, differences of the fifth embodiment from the first embodiment described above will be mainly described, and similar matters will not be described. Although the description is given below with reference to FIGS. 23 to 26, in these drawings, the same reference numerals are given to the same components as those in the above-described embodiment.

Figure 23:
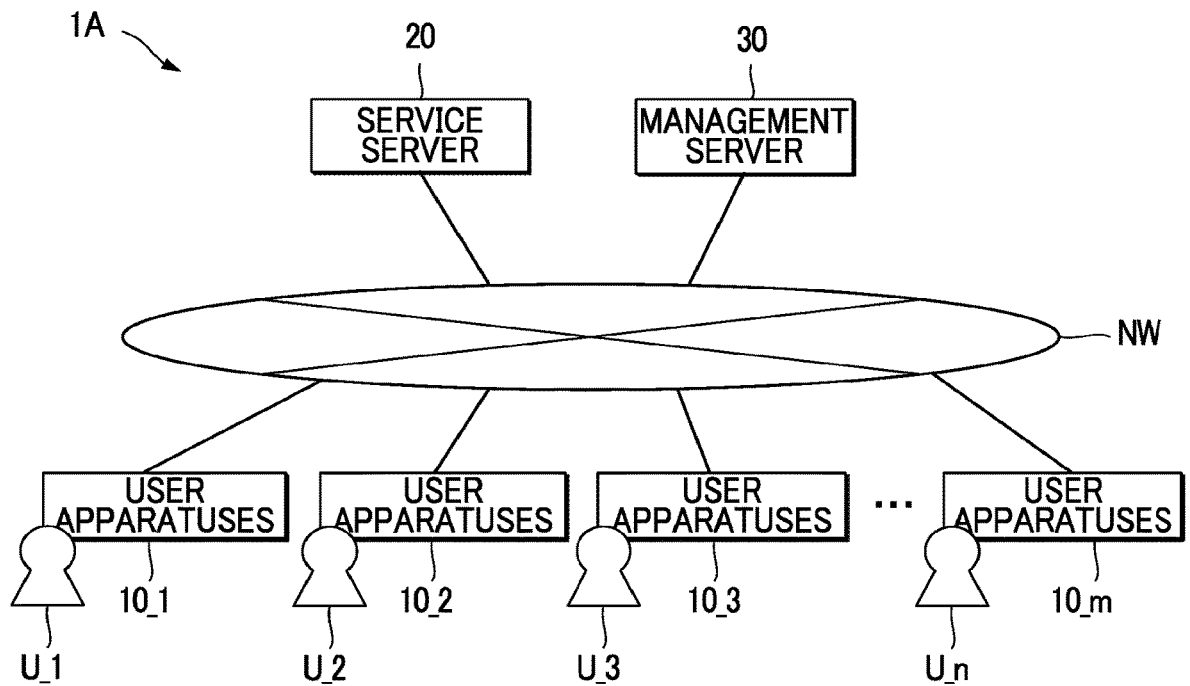
FIG. 23 is a block diagram showing an overall configuration of a service system according to a fifth embodiment.

FIG. 23 is a block diagram showing an overall configuration of a service system according to a fifth embodiment. A service system 1A shown in FIG. 23 includes user apparatuses 10 owned by users U, a network NW, a service server 20, and a management server 30 which is an example of a "management apparatus".

Figure 24:
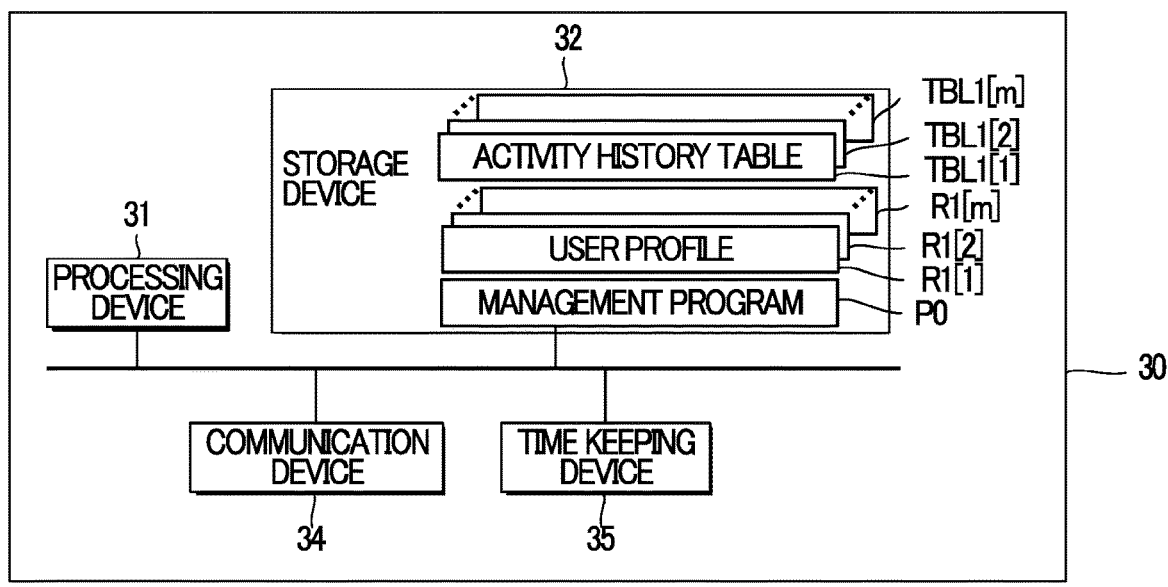
FIG. 24 is a block diagram showing a configuration example of hardware of a management server shown in FIG. 23.

FIG. 24 is a block diagram showing a configuration of hardware of the management server 30 shown in FIG. 23. The management server 30 is realized by a computer system including a processing device 31, a storage device 32, a communication device 34, and a time keeping device 35. The components of the management server 30 are connected to each other by a single bus or a plurality of buses. The term "device" denoted in the components of the management server 30 may be replaced with another term such as "circuit", "device", or "unit". In addition, each of the components of the management server 30 includes a single device or a plurality of devices, and some components of the management server 30 may not be provided.

The processing device 31 has a configuration similar to that of the processing device 11, the storage device 32 has a configuration similar to that of the storage device 12, the communication device 34 has a configuration similar to that of the communication device 13, and the time keeping device 35 has a configuration similar to that of the time keeping device 17. However, the storage device 32 differs from the storage device 12 in terms of storing a management program P0 related to validity setting processing S200 (see FIG. 26). The storage device 32 stores user profiles R1[1] to R[m] of users U and activity history tables TBL1[1] to TBL1[m] of users U. In the following description, unless the m user profiles R1[1] to R[m] need to be distinguished from each other, any one user profile is represented as a user profile R1. When N activity history tables TBL1[1] to TBL1[m] need to be distinguished from each other, any one activity history table is represented as an activity history table TBL1.

Figure 25:
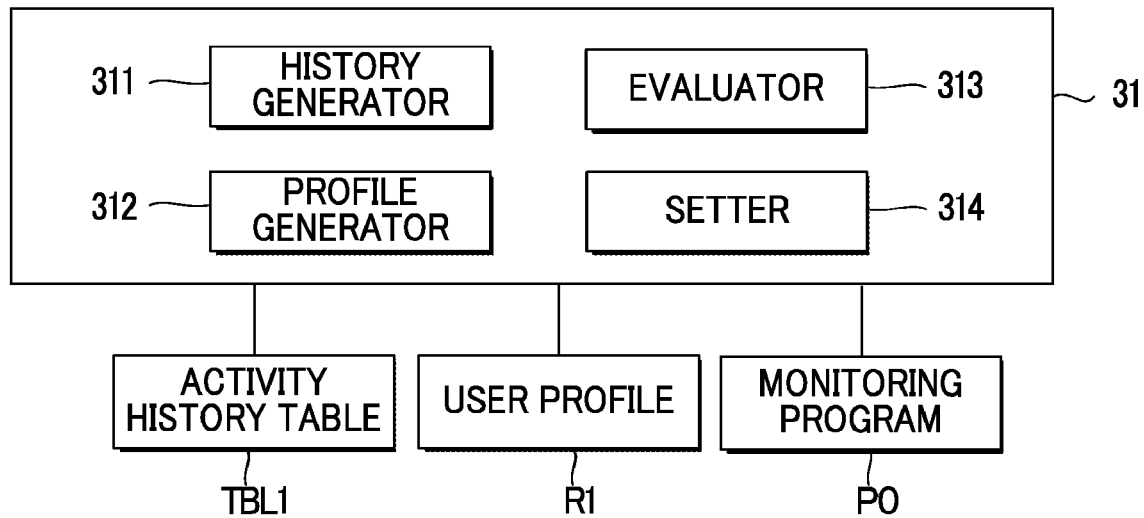
FIG. 25 is a functional block diagram showing a functional configuration example of the management server shown in FIG. 23.

FIG. 25 is a functional block diagram showing a functional configuration example of the management server 30 shown in FIG. 23. The processing device 31 of the management server 30 reads and executes the management program P0 from the storage device 32, thereby functioning as a history generator 311, a profile generator 312, an evaluator 313, and a setter 314. The history generator 311 has a configuration similar to that of the history generator 111, the profile generator 312 has a configuration similar to that of the profile generator 112, the evaluator 313 has a configuration similar to that of the evaluator 113, and the setter 314 has a configuration similar to that of the setter 114. The setter 314 only determines a state regarding validity of the electronic ticket, and does not perform the setting.

Figure 26:
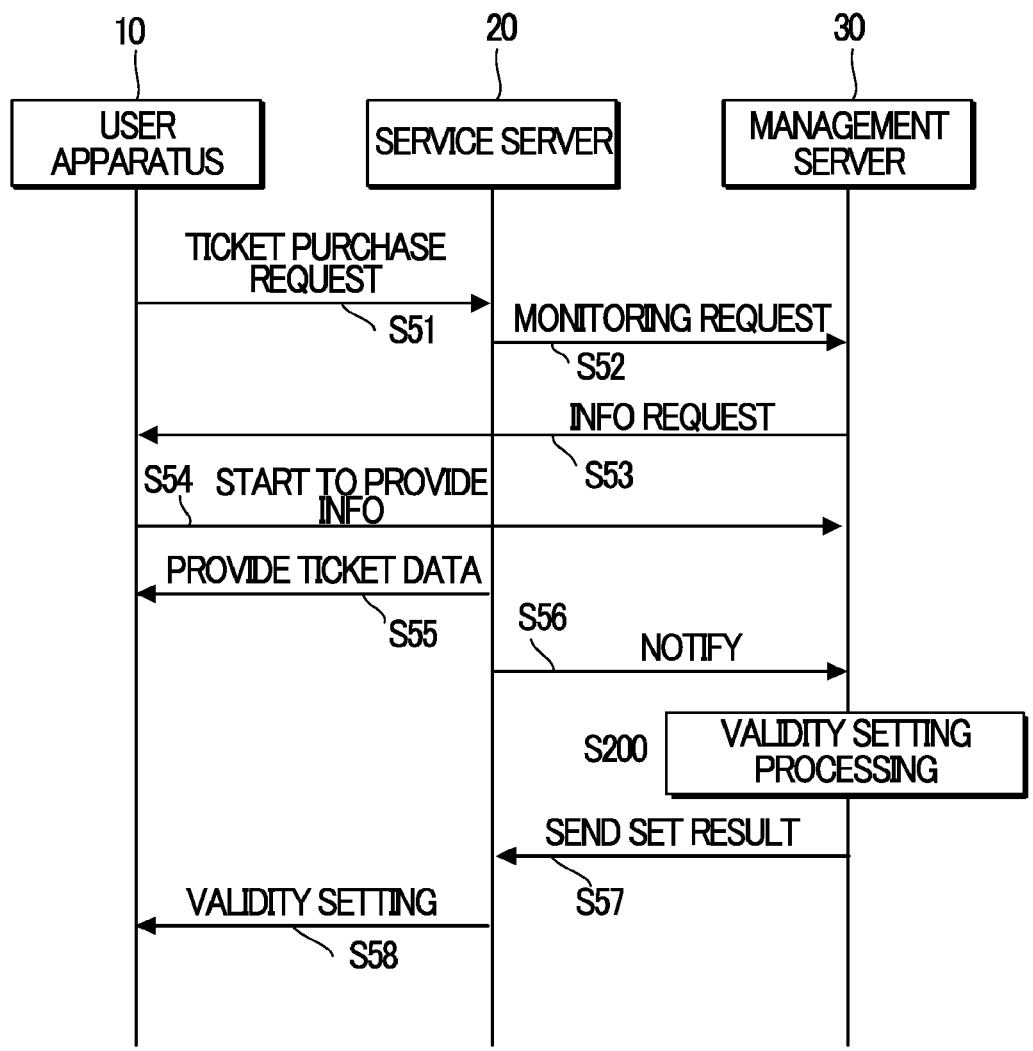
FIG. 26 is a sequence chart showing an operation of the system shown in FIG. 23.

An operation of the service system 1A will be described below. FIG. 26 is a sequence chart showing an example of processing relating to purchase of an electronic ticket in the service system 1A. First, a user apparatus 10 accepts an operation of a user U, and the user apparatus 10 transmits a purchase request indicating an application for purchase of an electronic ticket to the service server 20 (S51). Upon receiving the purchase request, the service server 20 requests the management server 30 to monitor the user apparatus 10 that applied for the electronic ticket (S52). The management server 30 requests the user apparatus 10 specified based on the monitoring request from the service server 20 to provide various types of information indicating activities of the user U (S53). The user apparatus 10 receives the request from the management server 30 and starts providing various types of information indicating the activities of the user U to the management server 30 (S54). Examples of the various types of information indicating the activities of the user U include an URL of a browsed webpage, information relating to walking of the user U, a cell ID in which the user is located, and position information based on a GPS signal.

Then, the service server 20 provides electronic ticket data D1 to the user apparatus 10 (S55), and notifies the management server 30 that the electronic ticket data D1 is provided to the user apparatus 10 (S56). The management server 30 executes validity setting processing when receiving the notification from the service server 20 (S200). For example, the validity setting processing described in the first embodiment is applicable to the validity setting processing S200.

The management server 30 executes the validity setting processing (S200) to set the state regarding the validity of the electronic ticket, and then transmits the set result to the service server 20 (S57). Upon receiving the set result of the state regarding the validity of the electronic ticket, the service server 20 executes setting in accordance with the set result for the electronic ticket stored in the user apparatus 10 (S58).

The management server 30 according to the present embodiment described above includes the evaluator 313 and the setter 314 that execute the validity setting processing S200. Upon receiving information from the service server 20 that the electronic ticket has been purchased by the user apparatus 10 owned by the user U (S56), the evaluator 313 evaluates identicalness of the user Uy in the post-purchase period and the person who purchased the electronic ticket, based on the pre-purchase profile R11 as "pre-purchase information" and the post-purchase profile R12 as "post-purchase information". In addition, the setter 314 sets the state regarding the validity of the electronic ticket based on the result of the evaluation by the evaluator 313.

In the management server 30, since the evaluator 313 is provided, it is possible to evaluate the identicalness of the person who purchased the electronic ticket and the user Uy in the post-purchase period X20, using different activities for individuals. In the management server 30, since the setter 314 is provided, for example, it is possible to invalidate the electronic ticket when it is determined that the person who purchased the electronic ticket has lent or transferred the user apparatus 10 itself to another person other than the person after purchasing the electronic ticket. Therefore, it is possible to reduce or prevent illegal resale of the electronic ticket due to lending or transfer of the user apparatus 10 itself. When the user apparatus 10 determines that the identicalness between the person who purchased the electronic ticket and the user Uy in the post-purchase period X20 is high, the electronic ticket is validated, for example. In this case, the person who purchased the electronic ticket is able to use the electronic ticket.

The validity setting processing described in the second embodiment, the third embodiment, the fourth embodiment, and the modification may be applied to the validity setting processing S200 described above.

In the fifth embodiment as described above, similarly to the first embodiment, it is possible to reduce or prevent illegal resale of the electronic ticket due to lending or transfer of the user apparatus 10 itself.

6. Other Matters

In the embodiments described above, the storage device 12 is a recording medium that is able to be read by the processing device 11 and has been exemplified by a ROM, a RAM, and the like. However, examples of the storage device 12 include a flexible disk, a magneto-optical disk (for example, a compact disk, a digital versatile disk, or a Blu-ray (registered trademark) disk), a smart card, a flash memory device (for example, a card, a stick, a key drive), a Compact Disc ROM (CD-ROM), a register, a removable disk, a hard disk, a floppy (registered trademark) disk, and a magnetic strip, a database, a server, and other suitable storage medium. The program may be transmitted from a network via a telecommunication line. The program may be transmitted from a communication network via an electronic communication line.

The above-described embodiments may be applied to a system that utilizes Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), or other suitable systems and/or to an enhanced next-generation system that is based on any of these systems.

In the embodiments described above, certain operations (for example, specification of position information by the base station) performed by the base station may be performed by its upper node in some cases. In a network including one or more network nodes having base stations, various operations performed to communicate with terminals may be apparently performed by the base stations and/or network nodes other than the base stations (for example, an MNME or an S-GW can be assumed, but the network nodes are not limited thereto). Although it has been described that the single network node other than the base stations is used in the above example, combinations of multiple other network nodes (for example, an MME, and an S-GW) may be used.

In the embodiments described above, information, signals, or the like may be presented with use of any of various different techniques. Throughout the above description, for example, data, an instruction, a command, information, a signal, a bit, a symbol, a chip, and so on may be represented by a voltage, a current, an electromagnetic wave, a magnetic field or a magnetic particle, an optical field or a photon, or any combination thereof. It is of note that terms described in the description and/or terms required to understand the description may be replaced with terms having the same or similar meanings.

In the embodiments described above, the input/output information may be stored in a specific location (for example, a memory), or may be managed by a management table. The input/output information can be overwritten, updated, or additionally written. The output information may be deleted. The input information may be transmitted to other devices.

In the embodiments described above, the determination may be performed by a value represented by 1 bit (0 or 1), may be performed by a Boolean value (true or false), or may be performed by numerical comparison (for example, comparison with a predetermined value).

In the sequence chart illustrated in the fifth embodiment described above, the order of the steps may be changed. In other words, the order of the processes in the preferred embodiment of the present invention is not limited to a specific order.

The respective functions illustrated in FIGS. 4 and 25 are realized by any combination of hardware and software. The respective functions may be realized as a single device, or as two or more devices configured separately from each other.

The program illustrated in the embodiments described above should be most widely interpreted to mean an instruction, an instruction set, a code, a code segment, a program code, a subprogram, a software module, an application, a software application, a software package, a routine, a subroutine, an object, an executable file, an execution thread, a procedure, or a function, regardless of the program being referred to as software, a firmware, a middleware, a microcode, a hardware descriptive language, or by other names. Furthermore, the software, the instruction, or the like may be transmitted and received via a transmission medium. For example, when the software is transmitted from a website, a server, or other remote sources using wired techniques such as a coaxial cable, an optical fiber cable, a twisted pair and a digital subscriber line (DSL) and/or wireless techniques such as infrared, radio frequency and microwave, these wired techniques and/or wireless techniques are included within the definition of the transmission medium.

In the embodiments described above, the terms "system" and "network" are interchangeably used.

In the embodiments described above, a base station can accommodate one or more (for example, three) cells (also referred to as sectors). When the base station accommodates multiple cells, the entire coverage area of the base station can be segmented into multiple smaller areas, and the respective smaller areas can provide communication services with a base station subsystem (for example, indoor small base station RRH: Remote Radio Head). The terminology "cell" or "sector" indicates a part or the entirety of the coverage area of the base station providing communication services in the coverage and/or the base station subsystem. Furthermore, the terminologies "base station", "eNB", "cell" and "sector" can be interchangeably used in the description. The base station may be referred to by terms such as a fixed station, a NodeB, an eNodeB (eNB), an access point, a femtocell, and a small cell.

In the embodiments described above, a user apparatus 10 includes a mobile station. The mobile station may also be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other appropriate term.

In the embodiments described above, the term "connected" or all variations thereof mean any direct or indirect connection or coupling between two or more elements and can include the existence of one or more intermediate elements between two mutually "connected" elements. The connection between elements may be physical, logical, or combinations thereof. If the term is used in the description, it can be considered that two elements are mutually "connected" with use of one or more electrical wires, cables and/or printed electrical connections and as some non-limiting and non-comprehensive examples, with use of electromagnetic energy such as electromagnetic energy having a wavelength in a radio frequency domain, a microwave domain, and an optical (that is, both visible and invisible) domain.

In the embodiments described above, the phrase "based on" does not mean "based only on" unless it is so specified. In other words, the phrase "based on" means both "based only on" and "based at least on".

In the embodiments described above, as long as the terms "including", "comprising" and variations thereof are used in the description or claims, these terms are intended to be inclusive similar to the term "comprising". Furthermore, the term "or" as used in the description or claims is intended not to be an exclusive OR.

Throughout this application, for example, when articles such as "a", "an", and "the" are added in translation into English, such articles refer to including the plural unless otherwise recognized from context.

It will be apparent to those skilled in the art that the present invent is not limited to the embodiments described above. The present invention can be modified and modified without departing from the spirit and scope of the present invention defined based on the description of claims. Accordingly, the description is merely illustrative and the present invention is not limited thereto. The present invention may combine some embodiments selected from the embodiments illustrated in the description.

DESCRIPTION OF REFERENCE SIGNS 1 service system
1A service system
10 user apparatus
20 service server
30 management server
NW network
U user X10 pre-purchase period
X20 post-purchase period
X21 post-purchase period
X22 post-purchase period
X23 post-purchase period
X24 post-purchase period
X25 post-purchase period
X26 post-purchase period
X27 post-purchase period
X30 additional period
X41 reference period
X42 reference period
T0 download time
T1 application time
T10 use time
T2 acquisition time (purchase time)
T3 determination time
T4 additional determination time

The invention claimed is:

1. A mobile terminal apparatus comprising:
a motion sensor configured to detect an acceleration of the mobile terminal apparatus;
a Global Positioning System (GPS) device configured to acquire a position of the mobile terminal apparatus;
a display;
at least one memory storing:
  pre-purchase information relating to activities of a first user of the mobile terminal apparatus during a first period representative of a period before purchase of an electronic ticket;
  post-purchase information relating to activities of a second user of the mobile terminal apparatus during a second period that follows the first period and is representative of a period after the purchase of the electronic ticket; and
  a program;
at least one processor configured to implement the program to:
  calculate a first average walking speed of the first user based on a first acceleration detected by the motion sensor during the first period;
  acquire a first position from the GPS device during the first period;
  generate the pre-purchase information to be stored in the at least one memory, the pre-purchase information including:
    the calculated first average walking speed of the first user; and
    the acquired first position;
  calculate a second average walking speed of the second user based on a second acceleration detected by the motion sensor during the second period;
  acquire a second position from the GPS device during the second period;
  generate the post-purchase information to be stored in the at least one memory, the post-purchase information including:
    the calculated second average walking speed of the second user; and
    the acquired second position;
  calculate an evaluation value representing identicalness of whether the second user during the second period is a same person as the first user during the first period, based on:
    the generated pre-purchase information including the first average walking speed of the first user and the first position; and
    the generated post-purchase information including the second average walking speed and the second position; and
  set a state relating to validity of the electronic ticket by comparing the calculated evaluation value with a threshold,
wherein in a third period that follows the second period, the at least one processor is further configured to:
  generate reference information relating to activities of the first user during the first and second periods, the reference information including:
    the generated pre-purchase information; and
    the generate post-purchase information;
  generate new post-purchase information relating to activities of the second user during the third period;
  calculate a new evaluation value representing identicalness of whether the second user during the third period is a same person as the first user during the first period based on the generated reference information and new post-purchase information; and
  automatically set the state relating to validity of the electronic ticket by comparing the calculated new evaluation value with the threshold, and
  automatically show the electronic ticket on the display based on the electronic ticket being set to valid.

2. The mobile terminal apparatus according to claim 1, wherein the at least one processor is further configured to implement the program to invalidate the electronic ticket based on the evaluation value being less than the threshold.

3. The mobile terminal apparatus according to claim 1, wherein the at least one processor is further configured to implement the program to:
  carry out user authentication based on the evaluation value being less than the threshold; and
  validate the electronic ticket based on the user authentication being valid.

4. The mobile terminal apparatus according to claim 1, wherein the at least one processor is further configured to implement the program to:
  based on the evaluation value being less than the threshold,
  acquire an answer by the second user in the second period, wherein the answer is to one or more questions regarding the activities of the first user during the first period;
  determine whether the acquired answer is correct or incorrect; and
  set the state relating to validity of the electronic ticket depending on a determination result.

5. The mobile terminal apparatus according to claim 1, wherein the pre-purchase information is pre-purchase characteristics information that characterizes the first user in the first period.

6. The mobile terminal apparatus according to claim 1, wherein:
  the post-purchase information is generated repeatedly over time, and
  the at least one processor is further configured to implement the program to, each time new post-purchase information is generated, calculate the evaluation value based on the pre-purchase information and the new post-purchase information.

7. The mobile terminal apparatus according to claim 2, wherein the at least one processor is further configured to implement the program to:
  carry out user authentication based on the evaluation value being less than the threshold; and validate the electronic ticket based on the user authentication being valid.

\* \* \* \* \*